(12) United States Patent
Shuster

(10) Patent No.: US 9,166,974 B2
(45) Date of Patent: Oct. 20, 2015

(54) CAPTCHA SYSTEMS AND METHODS

(71) Applicant: Gary Stephen Shuster, Fresno, CA (US)

(72) Inventor: Gary Stephen Shuster, Fresno, CA (US)

(73) Assignee: Gary Shuster, Fresno, CA (US)

( * ) Notice: Subject to any disclaimer, the term of this patent is extended or adjusted under 35 U.S.C. 154(b) by 0 days.

(21) Appl. No.: 14/641,068

(22) Filed: Mar. 6, 2015

(65) Prior Publication Data

US 2015/0180856 A1 Jun. 25, 2015

Related U.S. Application Data

(63) Continuation of application No. 14/147,253, filed on Jan. 3, 2014, now Pat. No. 8,978,121.

(60) Provisional application No. 61/749,185, filed on Jan. 4, 2013.

(51) Int. Cl.
*H04L 29/06* (2006.01)
*G06F 21/31* (2013.01)
*G06F 21/36* (2013.01)

(52) U.S. Cl.
CPC .............. *H04L 63/083* (2013.01); *G06F 21/31* (2013.01); *G06F 21/316* (2013.01); *G06F 21/36* (2013.01); *H04L 63/08* (2013.01); *H04L 63/126* (2013.01); *G06F 2221/2133* (2013.01)

(58) Field of Classification Search
CPC ......... H04L 63/08; H04L 63/26; G06F 21/31; G06F 21/36; G06F 2221/2133
See application file for complete search history.

(56) References Cited

U.S. PATENT DOCUMENTS

| | | | | |
|---|---|---|---|---|
| 5,991,617 A * | 11/1999 | Powell | ................... | H04W 12/12 455/403 |
| 8,495,518 B2 * | 7/2013 | Boden | ..................... | G06F 21/36 345/582 |
| 2008/0066014 A1 * | 3/2008 | Misra | ...................... | G06F 21/36 715/846 |
| 2009/0138723 A1 * | 5/2009 | Nyang | .................... | G06F 21/36 713/182 |
| 2009/0319270 A1 * | 12/2009 | Gross | ...................... | G01L 17/26 704/246 |
| 2010/0228804 A1 * | 9/2010 | Dasgupta | .......... | G06F 17/30864 345/557 |
| 2011/0208716 A1 * | 8/2011 | Liu | ................... | G06F 17/30247 707/710 |

* cited by examiner

*Primary Examiner* — Chau Le
(74) *Attorney, Agent, or Firm* — Sherrie M. Flynn; Coleman & Horowitz, LLP

(57) ABSTRACT

Systems and methods for verifying human users through cognitive processes that computers cannot imitate are described herein. Human cognitive language processing techniques may be used to verify human users. Visual patterns and tests may be used to distinguish between humans and computers because computer-based visual recognition is fundamentally different from human visual processing. Persistent plugins and tests may be used to continuously verify human users.

4 Claims, 16 Drawing Sheets

FIG. 2C

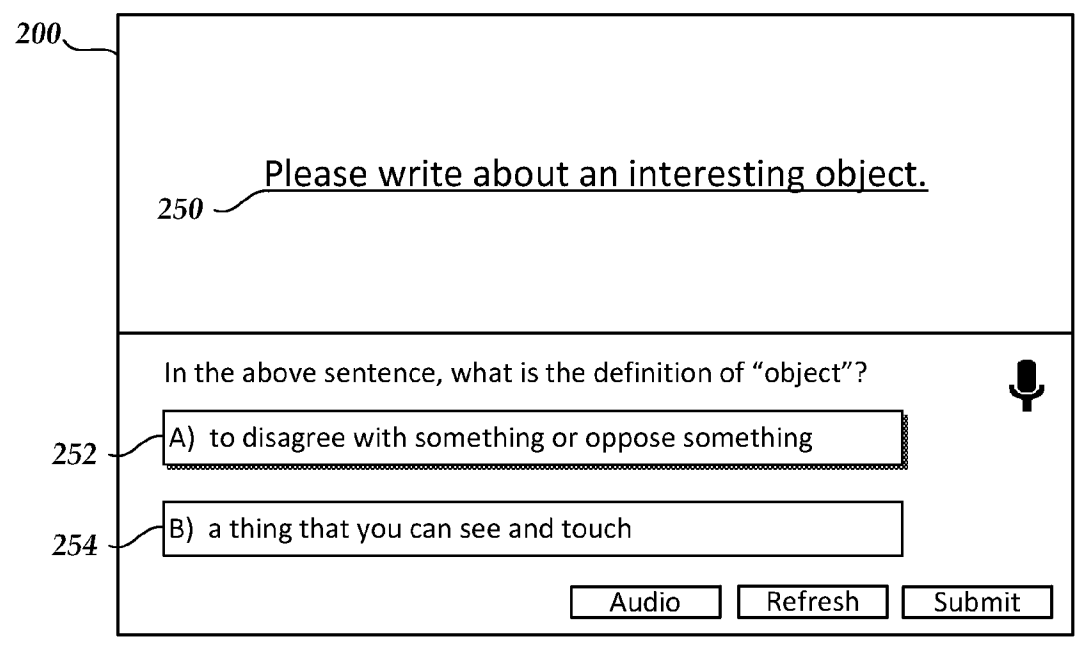

Please write about an interesting object.

250

In the above sentence, what is the definition of "object"?

A) to disagree with something or oppose something

B) a thing that you can see and touch

252

254

Audio  Refresh  Submit

200

```
<moire>
<circle x="0" y="0" r="0.065" stroke="black" width="0.04" id="circle1"/>
<circle x="0" y="0" r="0.165" stroke="black" width="0.04" id="circle2"/>
<circle x="0" y="0" r="0.265" stroke="black" width="0.04" id="circle3"/>
<circle x="0" y="0" r="0.365" stroke="black" width="0.04" id="circle4"/>
<circle x="0" y="0" r="0.465" stroke="black" width="0.04" id="circle5"/>
<circle x="0" y="0" r="0.565" stroke="black" width="0.04" id="circle6"/>
<circle x="0" y="0" r="0.665" stroke="black" width="0.04" id="circle7"/>
<circle x="0" y="0" r="0.765" stroke="black" width="0.04" id="circle8"/>
<circle x="0" y="0" r="0.865" stroke="black" width="0.04" id="circle9"/>
<circle x="0" y="0" r="0.965" stroke="black" width="0.04" id="circle10"/>
<circle x="0" y="0" r="1.065" stroke="black" width="0.04" id="circle11"/>
<circle x="0" y="0" r="1.165" stroke="black" width="0.04" id="circle12"/>
<circle x="0" y="0" r="1.265" stroke="black" width="0.04" id="circle13"/>
<circle x="0" y="0" r="1.365" stroke="black" width="0.04" id="circle14"/>
<circle x="0" y="0" r="1.465" stroke="black" width="0.04" id="circle15"/>
<circle x="0" y="0" r="1.565" stroke="black" width="0.04" id="circle16"/>
<circle x="0" y="0" r="1.665" stroke="black" width="0.04" id="circle17"/>
<circle x="0" y="0" r="1.765" stroke="black" width="0.04" id="circle18"/>
<circle x="0" y="0" r="1.865" stroke="black" width="0.04" id="circle19"/>
<circle x="0" y="0" r="1.965" stroke="black" width="0.04" id="circle20"/>
</moire>
```

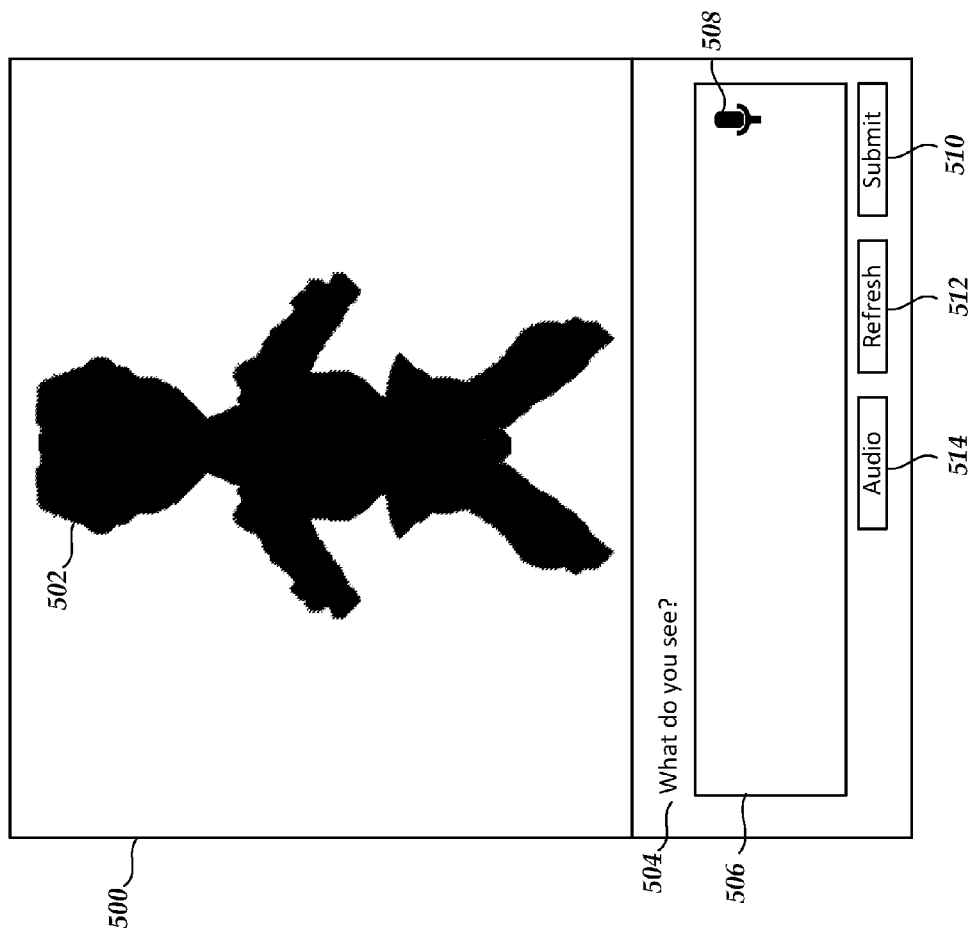

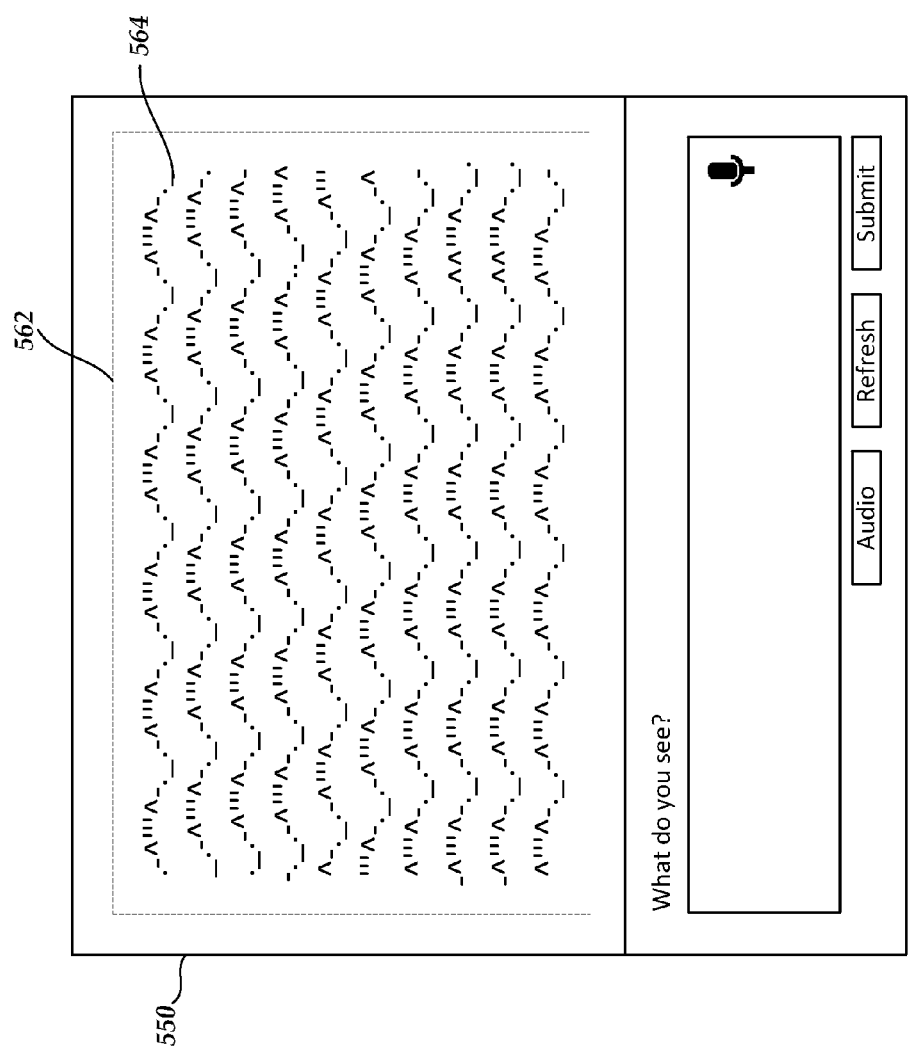

CAPTCHA SYSTEMS AND METHODS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/147,253 filed Jan. 3, 2014, which claims benefit of U.S. Provisional Patent Application Ser. No. 61/749,185 filed Jan. 4, 2013. Each of these applications are hereby incorporated by reference herein in their entireties.

This application is related to but does not claim priority from U.S. Pat. No. 6,895,236 entitled "Method for Verifying Geographical Location of Wide Area Network Users" filed Aug. 23, 2001, which is hereby incorporated by reference in its entirety and referred to herein as the "Location reference."

BACKGROUND

In the area of computer-based platforms, reverse Turing tests may be used to tell humans and computers apart.

SUMMARY

The systems, methods, techniques, and devices described herein each have several aspects, no single one of which is solely responsible for its desirable attributes. Without limiting the scope of this disclosure, several non-limiting features will now be discussed briefly.

In some embodiments, a computer system configured to validate language CAPTCHAs comprises one or more hardware processors programmed via executable code instructions. When executed, the executable code instructions may cause the computer system to implement a CAPTCHA generator. The CAPTCHA generator may be configured to determine a phrase of words. The CAPTCHA generator may further be configured to determine one or more spelling and/or grammatical errors to insert into respective words of the phrase. The CAPTCHA generator may further be configured to generate a language CAPTCHA comprising the phrase of words including the determined one or more errors. The one or more errors may be configured for human perception of the phrase of words based on the language CAPTCHA notwithstanding inclusion of the one or more errors in the language CAPTCHA. When further executed, the executable code instructions may cause the computer system to implement a human validator. The human validator may be configured to receive user input data associated with the language CAPTCHA. The human validator may be further configured to compare the user input data to the phrase of words. The human validator may be further configured to determine whether the user input data was provided by a human based on said comparison.

In some embodiments, a computer system configured to validate heteronym CAPTCHAs comprises one or more hardware processors programmed via executable code instructions. When executed, the executable code instructions may cause the computer system to implement a CAPTCHA generator. The CAPTCHA generator may be configured to determine a phrase of words. The phrase of words when perceived together may comprise one or more meanings associated with the phrase of words that assist human perception of the phrase of words. The phrase of words may further comprise one or more heteronyms based on the one or more meanings associated with the phrase of words. The CAPTCHA generator may further be configured to generate a heteronym CAPTCHA comprising the phrase of words including the one or more heteronyms. The one or more heteronyms may be configured for human perception based on the one or more meanings associated with the phrase of words. When further executed, the executable code instructions may cause the computer system to implement a human validator. The human validator may be configured to receive user input data associated with the heteronym CAPTCHA. The human validator may be further configured to compare the user input data to two or more definitions corresponding to the one or more respective heteronyms. The human validator may be further configured to determine whether the user input data was provided by a human based on said comparison.

In some embodiments, a computer system configured to validate visual CAPTCHAs comprises one or more hardware processors programmed via executable code instructions. When executed, the executable code instructions may cause the computer system to implement a CAPTCHA generator. The CAPTCHA generator may be configured to generate a visual CAPTCHA comprising a visual pattern configured to be perceived as including a first object and/or action by a human user viewing the visual pattern. An automated computer system analyzing the visual pattern may not identify the first object and/or action. When further executed, the executable code instructions may cause the computer system to implement a human validator. The human validator may be configured to receive user input data associated with the visual CAPTCHA. The human validator may be further configured to compare the user input data to the first object and/or action. The human validator may be further configured to determine whether the user input data was provided by a human based on said comparison.

BRIEF DESCRIPTION OF THE DRAWINGS

Certain aspects of the disclosure will become more readily appreciated as those aspects become better understood by reference to the following detailed description, when taken in conjunction with the accompanying drawings.

FIG. 2C illustrates an example cognitive CAPTCHA comprising a written heteronym, according to some embodiments of the present disclosure.

FIG. 3D illustrates example data comprising a moiré pattern of a cognitive CAPTCHA, according to some embodiments of the present disclosure.

FIG. 5A illustrates an example cognitive CAPTCHA comprising a rorschach pattern, according to some embodiments of the present disclosure.

FIG. 5C illustrates an example cognitive CAPTCHA comprising a visual persistence pattern, according to some embodiments of the present disclosure.

DETAILED DESCRIPTION

Reverse Turing tests may be used to tell humans and computers apart. A type of reverse Turing test is the Completely Automated Public Turing test to tell Computers and Humans Apart ("CAPTCHA"). CAPTCHA may be a mechanism whereby a computer issues a test to elicit an answer from an end user that enables the computer to determine whether the end user is a human. For example, a CAPTCHA may display text as a graphic, which may be partially obscured and/or distorted, and require the end user to respond with text characters. In another example, a CAPTCHA may display known and unknown graphic words simultaneously. If the end user successfully identifies the known word, the end user's answer for the unknown word may be used by the CAPTCHA system to "solve" the unknown word. The technique for solving for unknown tests through end user input will be referred to herein as "reCAPTCHA."

In addition to mechanisms designed to elicit and use one or more answers based on partially obscured and/or distorted graphic text, disclosed herein are systems, methods, techniques, and devices for CAPTCHAs that take advantage of various human cognitive processes that computers cannot accurately imitate. The terms "cognitive CAPTCHA" and/or "cognitive reCAPTCHA" will be used within the disclosure herein and further illustrated below to collectively refer to improved CAPTCHAs and reCAPTCHAs that exploit various human cognitive processes that computers cannot accurately imitate. Using the methods and systems disclosed herein, efficient, robust, scalable, and/or accurate test results may be achieved for distinguishing between humans and machines. While some examples herein refer to the English language, the systems and methods are applicable to humans that speak and/or understand other languages.

Example Cognitive CAPTCHAs

Figure 1:
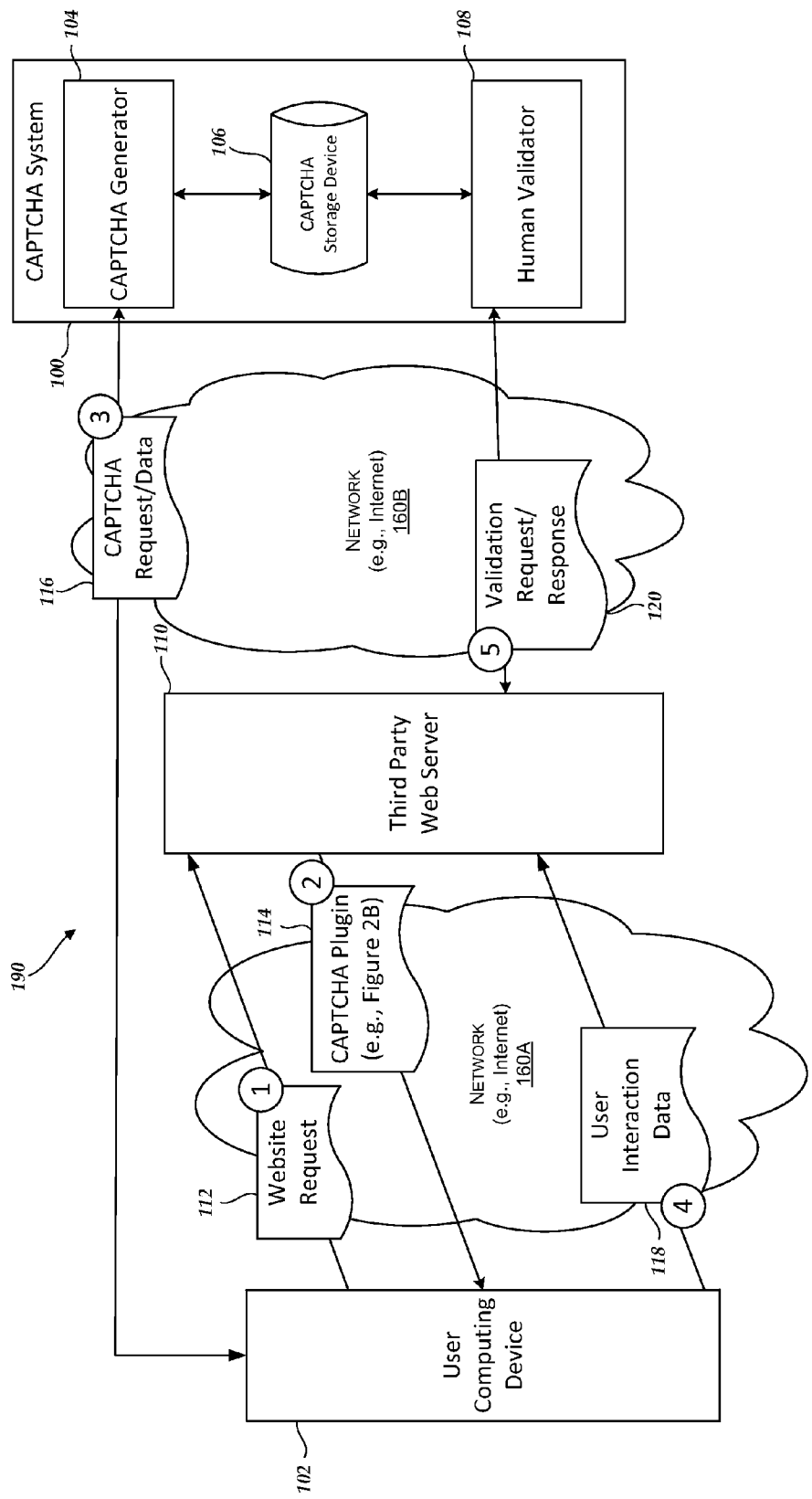
FIG. 1 is a block diagram illustrating an example CAPTCHA system, according to some embodiments of the present disclosure.

FIG. 1 illustrates a CAPTCHA system, according to some embodiments of the present disclosure. In the example embodiment of FIG. 1, the CAPTCHA environment 190 comprises a network 160 (including network 160A and network 160B), a CAPTCHA system 100, a user computing device 102, and a third party web server 110. Various communications between these devices are illustrated.

For example, the communication of a website request 112, a CAPTCHA plugin 114, a CAPTCHA request and/or data 116, user interaction data 118, and a validation request and/or response 120 are illustrated in various actions 1-5 that are illustrated in the circled numbers in FIG. 1. In this embodiment, the CAPTCHA system 100 includes a CAPTCHA generator 104, a CAPTCHA storage device 106, and a human validator 108, each of which is described in further detail below.

As shown in FIG. 1, at action one, the website request 112 is transmitted from the user computing device 102 to the third party web server 110 through the network 160. The website requested may be any website for which the operator/owner has implemented a CAPTCHA mechanism.

Figure 2A:
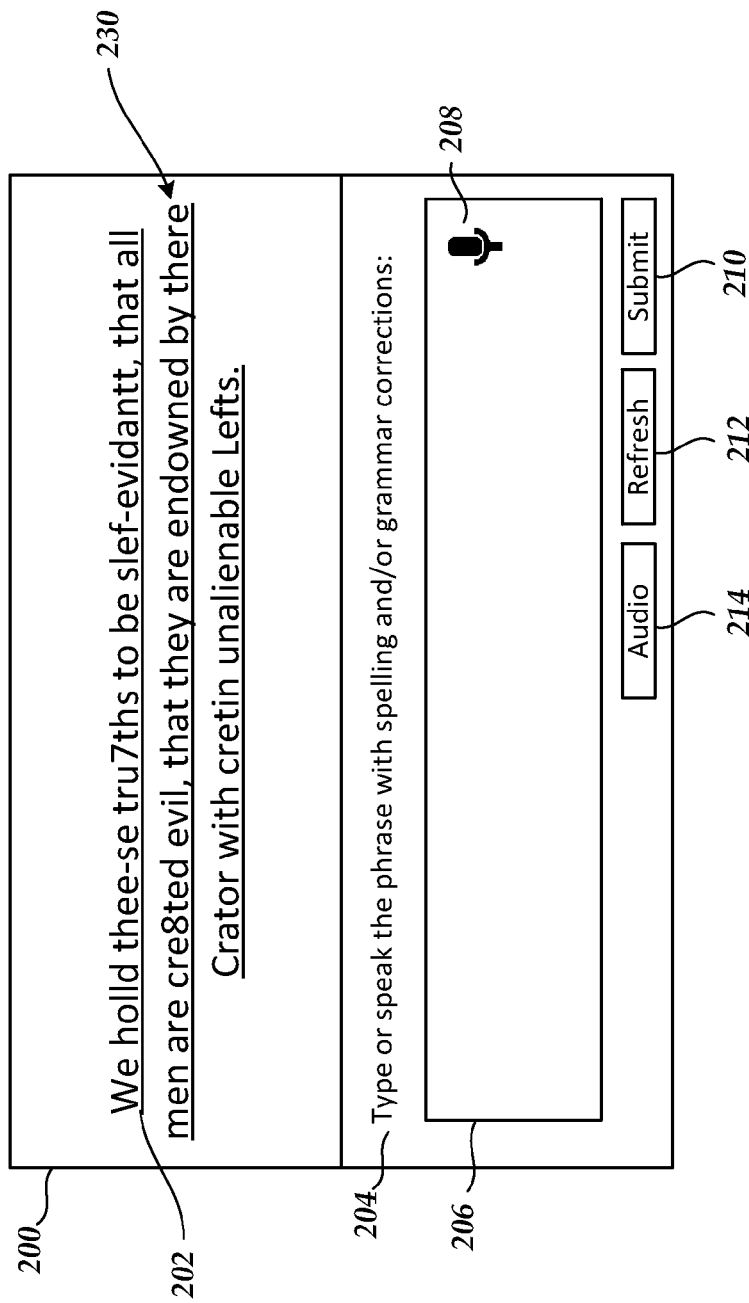
FIG. 2A illustrates an example cognitive CAPTCHA, according to some embodiments of the present disclosure.
Figure 2B:
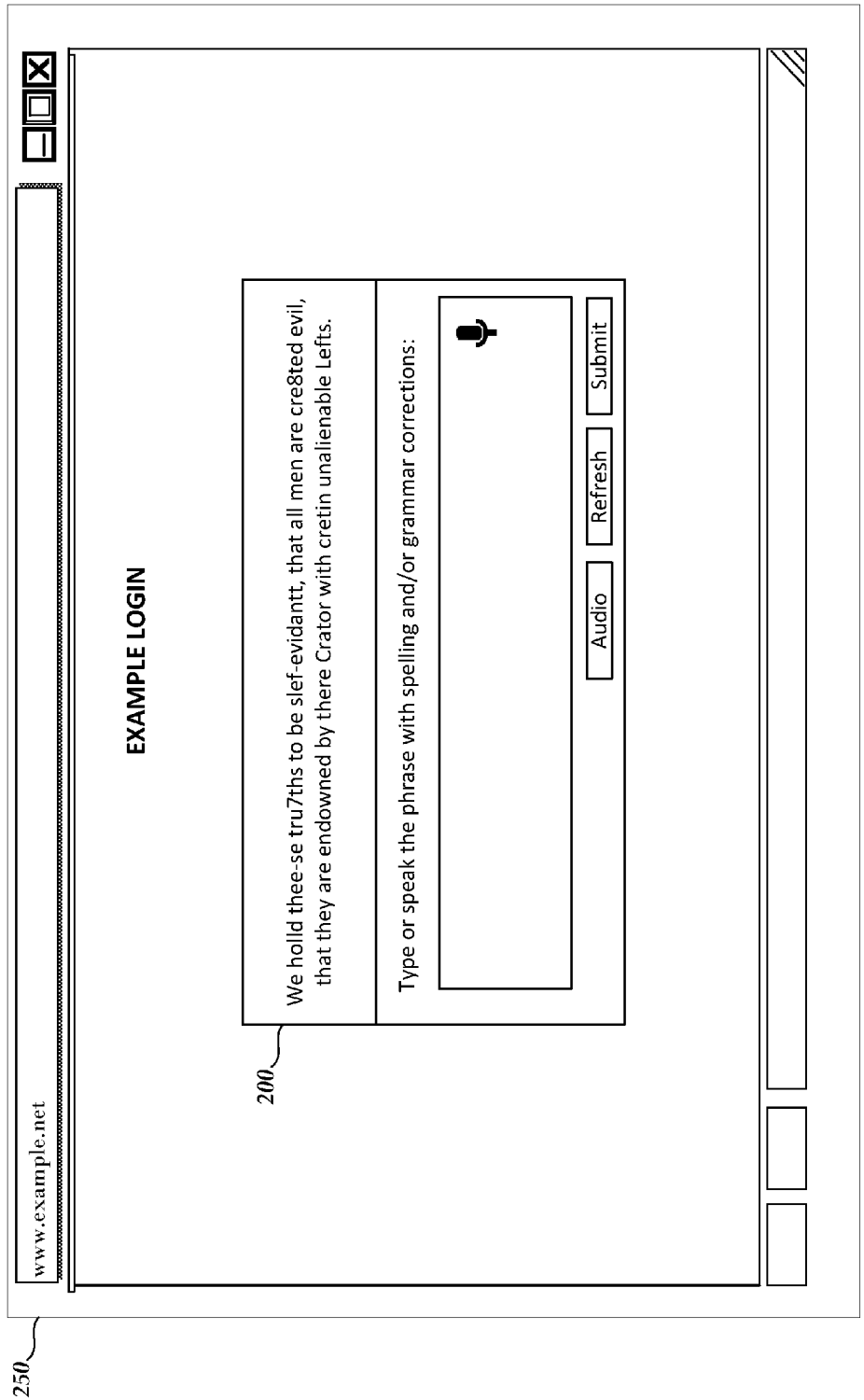
FIG. 2B illustrates a website comprising an example cognitive CAPTCHA, according to some embodiments of the present disclosure.

At action two, the third party web server 110 may transmit the CAPTCHA plugin 114 to the user computing device 102 through the network 160. The CAPTCHA plugin 114 may be sent with website data, which may have been in response to the website request 112. In some embodiments, the CAPTCHA plugin 114 may comprise source code instructions, data, and/or markup instructions, such as, but not limited to, JavaScript, XML, JSON, Hypertext Markup Language ("HTML"), and/or some combination thereof. For example, the CAPTCHA plugin 114, may be in a format such that web servers, similar to the third party web server 110, may embed the CAPTCHA plugin 114 in their websites and/or web applications without major alterations and/or modifications to their existing architectures. FIG. 2B illustrates an example cognitive CAPTCHA in a website. The website view 250 may correspond to the display of the website data with the CAPTCHA plugin 114 by a web browser.

At action three, there may be transmission of the CAPTCHA request and/or data 116 between the user computing device 102 and the CAPTCHA system 100 and/or the CAPTCHA generator 104 through the network 160. FIG. 2A illustrates an example cognitive CAPTCHA. The loading and/or execution of the CAPTCHA plugin 114 of FIG. 1 by a web browser, application, and/or other device may result in the display of the cognitive CAPTCHA 200 of FIG. 2A. Specifically, the loading and/or execution of the CAPTCHA plugin 114 may cause the user computing device 102 to transmit the CAPTCHA request 116. As a result, data comprising the text 202 of FIG. 2A, "We holld thee-se tru7ths to be slef-evidantt, that all men are cre8ted evil, that they are endowned by there Crator with cretin unalienable Lefts, that among thease are Life, Library and the pursuit of Hapyness," may be transmitted by the CAPTCHA system 100 and/or the CAPTCHA generator 104 in response to CAPTCHA request 116 of FIG. 1 (either directly from the CAPTCHA system 100 to the user computing divide 102, or from the CAPTCHA system 100 to the user computing device 102 via the third party Web server 110). The data comprising the text 202 of FIG. 2A may correspond to the CAPTCHA data 116 of FIG. 1. The CAPTCHA generator 104 may retrieve the CAPTCHA data 116 from the CAPTCHA storage device 106.

At action four, the end user may interact with the CAPTCHA to transmit the user interaction data 118 to the third party web server through the network 160. For example, the end user may interact with the cognitive CAPTCHA 200 of FIG. 2A. As illustrated in FIG. 2A, the end user may interpret and/or read the text 202. The end user may then follow the instructions 204 to "[t]ype or speak the phrase with spelling and/or grammar corrections." For example, the end user may type the phrase into the text box 206 and then click and/or press the submit button 210, which may cause the transmission of the user interaction data 118 of FIG. 1. The end user may also press and/or click the microphone icon 208 to speak the phrase into an input device of the user computing device, which may also cause the transmission of the user interaction data 118 of FIG. 1. In some embodiments, the cognitive CAPTCHA 200 may comprise a refresh button 212, such that if an end user clicks and/or presses the refresh button, the text and/or content 202 refreshes and/or changes. The end user may refresh the content of a cognitive CAPTCHA because the end user may find the content too difficult to interpret, read, understand, and/or solve. After several attempts, which may be configurable, the end user may be prohibited from refreshing the CAPTCHA to prevent against robots, computing devices, and/or machines from determining a correct answer to a cognitive CAPTCHA.

While some examples of cognitive CAPTCHAs in this disclosure may be limited to English, the techniques, systems, methods, and devices disclosed herein may be applicable to humans that speak languages other than English because human cognitive processing remains similar across languages, cultures, and/or nationalities. Furthermore, some examples of this disclosure may refer to one or more "humans," and it may be assumed that the human has limited to native proficiency with the English language. Although, as previously mentioned, cognitive CAPTCHAs may apply broadly to human cognitive abilities and is not limited to any language. Furthermore, the term "human" as used within this disclosure may refer to an animal, because the cognitive processing by a human and/or animal differs from machine and/or computer processing.

The content of a cognitive CAPTCHA may distinguish between a human and a machine because human processing, interpretation, and/or perception occurs differs from computer and/or machine data processing. For example, human processing, interpretation, and/or perception may successfully understand words where the first and/or last letters are in the correct place, regardless of the order of the other letters in a word. Additional cues, such as the presence of other words in a sentence, the context of a word and/or sentence, semantics of the phrase and/or sentence when perceived together and/or as a whole, meaning of the words and/or sentence when perceived together and/or as a whole, word length, and/or any other human perception factors may further ease human processing. The meaning of a phrase and/or sentence may assist in successfully understanding the phrase and/or sentence by a human when there are errors because the meaning of the words of the phrase and/or sentence together, combined, and/or as a whole has additional meaning beyond the words individually. The content of a cognitive CAPTCHA may comprise the sentence, wholly or partially: "Four sorce and sveen years ago our faethrs bruohgt frtoh on this cotninent, a new naiton, cncievoed in Lrebirty, and ddeitaced to the prpsooitoin that all men are ceraetd euqal." Due to human cognitive processing, most humans may be able to read the correct spelling of the words standing alone from the preceding quoted sentence. Furthermore, most humans may be able to read the words when placed in a phrase and/or sentence. For example, the above quoted sentence corresponds to the beginning of the Gettysburg Address, which may be a speech that many humans are familiar with. Thus, the meaning of the words from the Gettysburg Address together and/or combined has meaning beyond the individual words themselves that may assist in human interpretation and/or perception of the words. However, machines and/or computers may not possess knowledge in the same way that a human understands and/or has knowledge about the Gettysburg address and/or American history generally. Therefore, the human cognitive processing which may occur by a human to interpret misspelled words alone or in a sentence with context may be difficult for a machine to process and/or interpret.

The content 202 of the cognitive CAPTCHA 200 illustrates other aspects of human cognitive processing that may distinguish humans from machines. Human processing may be able to compensate for additional, missing, and/or substituted letters or symbols. For example, content 202 may comprise the text: "We holld thee-se tru7ths to be slef-evidantt, that all men are cre8ted evil, that they are endowned by there Crator with cretin unalienable Lefts." While the correct spelling may be "We hold these truths to be self-evident, that all men are created equal, that they are endowed by their Creator with certain unalienable Rights," similar to the human cognitive processing that was able to process words and/or sentences with misplaced letters, human cognitive processing may be able to correctly interpret the words and/or phrase from the content 202. Similar to the difficulty a machine may have in interpreting the misplaced letters of words whether in a sentence or alone, it may be difficult for a machine to interpret content 202. Therefore, the addition, lack of, and/or substituted letters or symbols, may be used as part of a cognitive CAPTCHA test to distinguish between humans and machines.

In some embodiments, the cognitive CAPTCHA and/or the CAPTCHA system may be deployed in a manner that reduces the effectiveness of systems and devices designed to distribute CAPTCHA problems to outsourced CAPTCHA solving centers. For example, an automated data scraping system may encounter a CAPTCHA, do a screen capture, send the CAPTCHA to the screen of a worker in a center located in Brazil, and resume data scraping after the human in Brazil has solved the CAPTCHA. In some embodiments, by tying the cognitive CAPTCHA to linguistic, cultural, regional, and/or other characteristics of the intended end users of the CAPTCHA system, automated mechanisms that incorporate distributed human CAPTCHA solving are rendered ineffective or less effective. Taking the example further, if the automated data scraping system were attacking a site housing archives of California newspapers written in English, setting the CAPTCHAs to include a strong bias in favor of high-competence English speakers and/or those with cultural/historical knowledge of California and/or the United States would strongly limit the options for outsourcing of human CAPTCHA cracking. The examples illustrated herein also contemplate the countermeasures taken by a system against such a bias, for example, evaluating the language and/or cultural/historical bias of the CAPTCHAs and sending them for solution to persons with appropriate skills and/or background.

In some embodiments, homonyms and/or homophones may be used for the content of a cognitive CAPTCHA. For example, the text content 202 includes the word "there" 230, which is a homonym for the correct word "their" in that phrase's context. In another example, the content may comprise the text, "he came at me with an acts," and the CAPTCHA test may ask the end user to correctly spell the phrase and/or sentence. "Acts" and "axe" are homonyms. Therefore, a human end user may be able to determine the correct answer and/or replace "acts" with "axe" because the words sound similar, which may be difficult for a machine to determine. In some embodiments, the end user may be asked to identify the incorrect homonym and/or homophone within a phrase and/or sentence. For example, the text may comprise, "the pair tasted sweet going past his pallet," where "pair" (instead of "pear") and "pallet" (instead of "palate") were incorrect, whereas "past," which has the homophone "passed," was correct). Such distinctions may be difficult to identify programmatically, whereas human cognition may be able to identify the incorrect homonyms and/or homophones.

Certain techniques may be used to reduce human failures of cognitive CAPTCHAs, e.g., situations where humans fail a CAPTCHA test. For example, the greater the deviation from the correct presentation, the higher the likelihood that a human end user will unsuccessfully answer the CAPTCHA. Most humans may easily identify the term "Persident Obama," "Persident Omaba" may be more difficult, and "Psdneiert Om baa" may be still more difficult. Finally, misplacing the first and last letters, such as, "Dnpretsei Aaomb," may be too difficult for most humans to identify. Thus, to prevent human failures, certain structural and/or placements of letters should be avoided. For example, retaining sound groups and/or phonemes (such as "sh" or "ion") in words may prevent human failures. Keeping letters close to their correct positions in words may also be useful to prevent human failures. To further prevent human failures, where additional letters and/or symbols are added, additional letters and/or symbols should be similar to the correct letters and/or symbols, and additional letters and/or symbols should not introduce a substantial additional element such as an extra syllable. For example, "holld" may be correctly spelled by a human because the extra "l" may not add an extra syllable to the world. In another example, "cr3ated" may be correctly interpreted by a human because the "3" resembles an "E" as interpreted and/or perceived by a human. However, by placing a word in context, it may be possible to alter the word in such a way that a false positive would be unlikely. For example, take the following sentence: "The most populous state is Cilfla77inor, located just south of Oregon." A human may correctly read and/or interpret the word "California" based on knowledge of California being the most populous state and/or located south of Oregon. Similarly, one or more completely wrong words may be substituted, relying entirely on context to make the correction, as in "Thomas Edison held many patents, but is probably best known for inviting the light dlod." In some embodiments, the difficulty of the phrase and/or word poses for human cognition may be manipulated by any one or a combination of these methods.

In some embodiments, audio cognitive CAPTCHAs may be used to distinguish between humans and machines. Audio cognitive CAPTCHAs may be desirable in some cases, such as, but not limited to, compliance with the Americans with Disabilities Act. Some of the techniques, systems, and/or methods in this disclosure, such as, but not limited to, substitution of an incorrect and/or misspelled word into a phrase, may be implemented as an audio cognitive CAPTCHA. An audio cognitive CAPTCHA and/or an audio component of a cognitive CAPTCHA may comprise a test where audio is played to an end user and the end user may type and/or speak the answer. For example, as illustrated in FIG. 2A, an end user may press and/or click the audio button 214 to be administered an audio test. The audio test may comprise audio playback and/or a recording of the text content 202 or other words and/or phrases.

In some embodiments, the end user may be asked to read and/or speak one or more words that may be a mispronunciation of a test word. For example, the cognitive CAPTCHA content may comprise the words "Phil Lying" (in text and/or audio) and the correct end user answer may be "filing" (where "Phil Lying" may be a mispronunciation of "filing"). Similarly, words with repeating adjacent sounds may together indicate a test word with the adjacent sounds reduced to a single sound, as in "Star Artling" corresponding to "startling" or "faux owning" corresponding to "phoning." In the "Star Artling" example, the end of the word "star" may be the same sound as beginning of the word "artling," and a human may be able to answer the test word "startling" from hearing and/or reading "Star Artling."

In some embodiments, data for use in the CAPTCHA system may be gathered by harvesting, monitoring, or otherwise using corrections to computerized transcriptions of audio data. For example, a user of the "Siri" function on the iPhone may state "Do you need me to pick up Ben, Anna, and the baby on the way home?" However, the audio to text service that converts the spoken words to text may transcribe it as "Do you need me to pick up banana and the baby on the way home?" The user would then manually correct "banana" to "Ben, Anna." In some embodiments, the data associated with the manual correction could be used as a source for a cognitive CAPTCHA, similar to the "Star Artling" example above.

In some embodiments, the end user may be asked to read and/or speak one or more words (which may comprise a nonsensical phrase and/or sentence), but when read together sound like another word or phrase with an alternative reading. For example, the cognitive CAPTCHA content may comprise the words "easel aid ease man" and the correct answer may be "he's a lady's man" because the test content when read aloud and/or silently by a human end user may phonetically sound like and/or be similar to the test answer when interpreted by a human end user. In another example, the test content may be "know sayer" and the test answer may be "nose hair." A machine and/or computer, even with a phonetic dictionary, may find it very difficult to find the associations between the unrelated words and/or phrases based on phonetic sounds. In some embodiments, one or more photographic and/or artistic images, whether rendered accurately, distorted, or otherwise, may be presented to aid the human in understanding the problem presented by the CAPTCHA. For example, in the "know sayer" example, a drawing with two dots at the top, an inverted triangle in the center of the middle and the bottom half of a circle at the bottom, with a slight line coming out of one part of the triangle, may be enough to prevent a false negative and/or human failure of the cognitive CAPTCHA (by providing the human with a crude image of a face with an artifact near the nose).

In some embodiments, cognitive CAPTCHAs may comprise heteronyms. A heteronym is one of two or more words that have the same spellings but different meanings and pronunciations. In some embodiments, the end user may be asked to identify the incorrectly pronounced word or words. For example, an audio phrase may be "You polish the record," where "polish" is pronounced as if referencing the country Poland, and/or "record" is pronounced as if referencing writing something down. In another example, the audio phrase may be "please write about an interesting object," where "object" is pronounced as if referencing somebody with an objection to a policy. A human may be able to identify each of the incorrectly pronounced words, while a computer and/or machine would be unlikely to succeed at the same task. In some embodiments, it may be desirable to include words with heteronyms, but to pronounce those words correctly so as to frustrate attempts to defeat the CAPTCHA by a machine with a dictionary of heteronyms. In some embodiments, written heteronyms may be used. For example, a person may be asked to identify the correct meaning of each heteronym. FIG. 2C illustrates an example cognitive CAPTCHA comprising a written heteronym. The cognitive CAPTCHA comprises text 250, "[p]lease write about an interesting object." The end user must choose between definition A 252, "to disagree with something or oppose something," and definition B 254, "a thing that you can see and touch." A human may select the correct choice, definition B 254, from understanding the context of the sentence, but it may be difficult for a computer and/or machine to select definition B 254.

Returning to FIG. 1, at action five the third party web server 110 may transmit a validation request 116 to the CAPTCHA system 100 and/or the human validator 108 through the network 160. The validation request 116 may comprise some or all of the user interaction data 118. Furthermore, the validation request 116 may comprise the answer and/or response from the end user based on the cognitive CAPTCHA test, a test identifier, the content of the cognitive CAPTCHA, such as the text content 202 of FIG. 2A, and/or an identifier for the content. The human validator 108 may then load the correct answer from the CAPTCHA storage device 106 and compare it to the answer and/or response from the end user. The human validator 108 may then send the validation response 116 to the third party web server 110 through the network 160 indicating whether the end user passed or failed the cognitive CAPTCHA test. The third party web server 110 may then use the validation response 116, e.g., to permission the end user for some activity and/or allow the end user to access some content. In some embodiments, the user interaction data 118 is sent directly to the CAPTCHA system 100 rather than via the third party web server 110, in this embodiment, a validation response (e.g. confirming that the user provided the correct interaction data for the CAPTCHA) may be provided to the third party web server 110 after the human validator 108 of the CAPTCHA system processes the user interaction data 118 received directly from the user computing device 102.

In some embodiments, it may be desirable for determination and/or any computation based on the end user answer and/or response to occur in the CAPTCHA system 100 instead of the user computing device 102. For example, if validation occurred through JavaScript that may be executed on the user computing device 102, a machine and/or computer may able to automatically inspect, decompile, and/or analyze the JavaScript source code to determine the correct answer, and, therefore, could defeat the cognitive CAPTCHA.

Example Moiré CAPTCHAs

In some embodiments, moiré patterns may be used, alone or in combination with the techniques, methods, and/or systems disclosed herein, as cognitive CAPTCHAs. A moiré pattern may be a visual pattern. For example, two identical patterns may be overlayed and/or superimposed to create a moiré pattern. In some examples, two patterns may be displaced and/or rotated a small amount from one another to create a moiré pattern. In some embodiments, cognitive CAPTCHAs with moiré patterns may allow the end user to control one or more characteristics and/or features of the grids, patterns, and/or interactions between the grids and/or patterns.

Figure 3A:
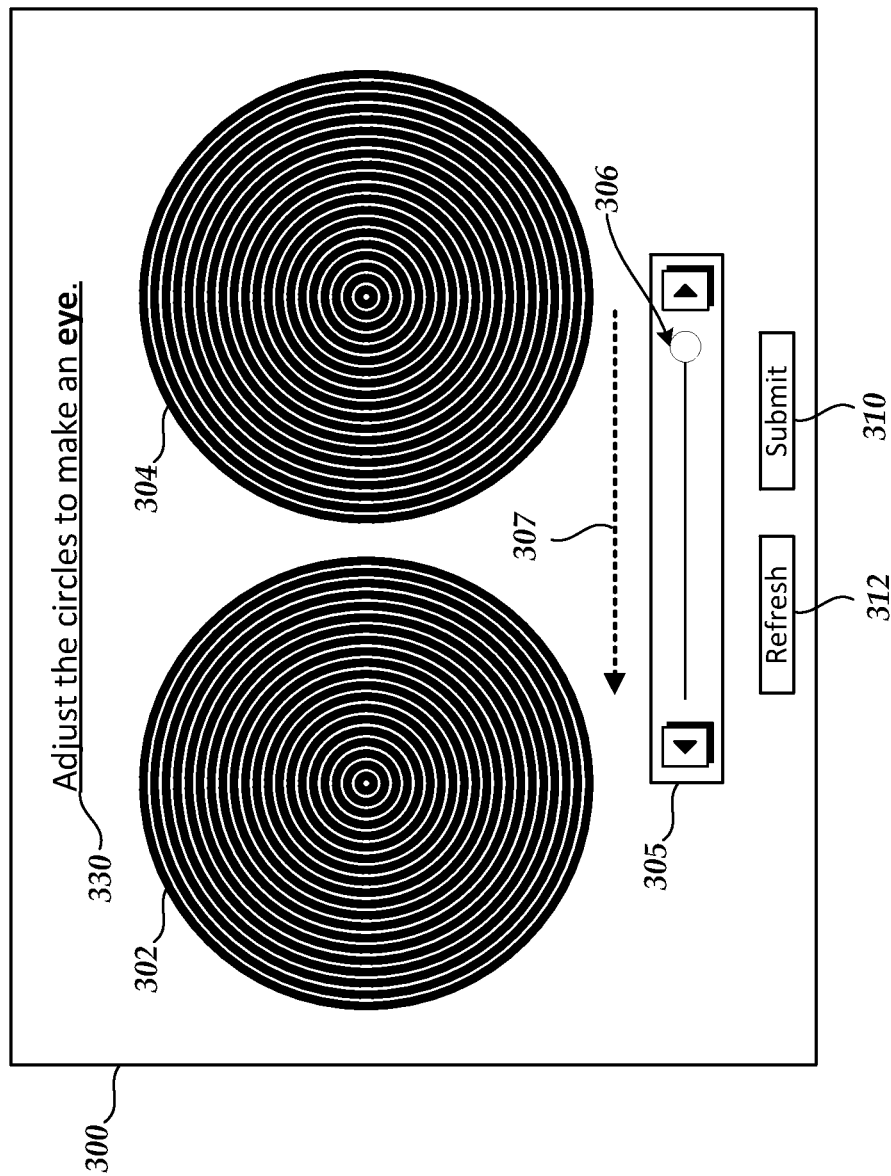
FIG. 3A illustrates an example cognitive CAPTCHA comprising a moiré pattern test, according to some embodiments of the present disclosure.

FIG. 3A illustrates an example cognitive CAPTCHA comprising a moiré pattern test. The cognitive CAPTCHA 300 may comprise an instruction 330, a first circle pattern 302, a second circle pattern 304, a pattern adjuster 305, a submit button 310, and a refresh button 312. The end user may be prompted with instruction 330 to "[a]djust the circles to make an eye." First circle pattern 302 may comprise twenty circles with the same origin, but with uniformly increasing radiuses. Second circle pattern 304 may be identical or similar to first circle pattern 302, but with a different vertical and/or horizontal coordinate for its origin. Differences between the two circles (e.g., number of rings, size of rings, coloring, etc.) may be implemented in other embodiments in order to cause the desired Moiré effect when the circles are properly overlapped. Additionally, any other shapes may be used in such a moiré-based CAPTCHA.

As illustrated by FIG. 3A, there may initially be no overlap between first circle pattern 302 and second circle pattern 304. The end user may select, touch, and/or press the dial 306 of the pattern adjuster 305 (or drag-and-drop the circles themselves in one embodiment). Dial 306 may be adjusted and/or its location may be moved as illustrated by arrow 307, which may adjust the proximity and/or location of the first circle pattern 302 and/or the second circle pattern 304.

Figure 3B:
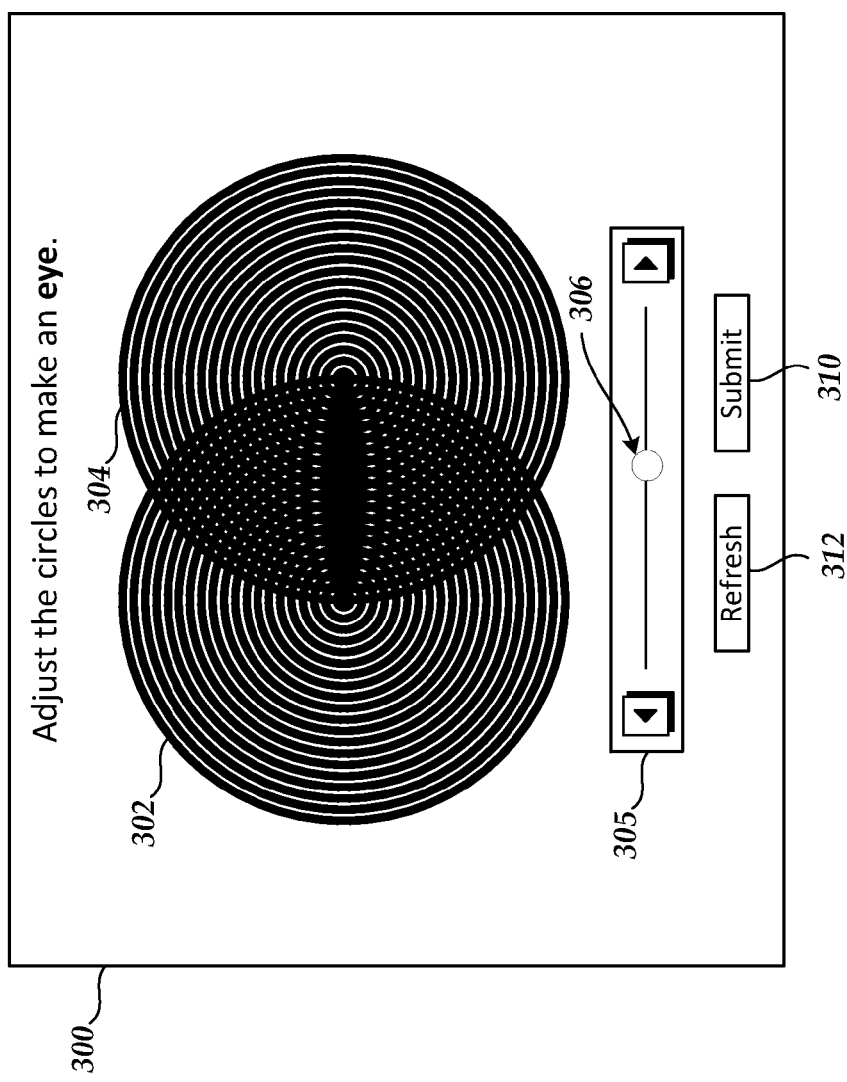
FIG. 3B illustrates an example cognitive CAPTCHA comprising a moiré pattern, according to some embodiments of the present disclosure.

FIG. 3B, illustrates cognitive CAPTCHA 300 after end user interaction. For example, the ender user may have interacted with the pattern adjuster 305, by adjusting and/or moving the dial 306 to a new position. As a result, the proximity and/or location of the first circle pattern 302 and/or the second circle pattern 304 may have changed. A moiré pattern may have been created from the overlap of first circle pattern 302 and second circle pattern 304. For example, the overlap between first circle pattern 302 and the second circle pattern 304 may have created a visual pattern with a dark and/or solid oval center and/or a grid and/or dotted surrounding pattern. The moiré pattern from the overlap of first circle pattern 302 and second circle pattern 304 may appear to be an "eye" as perceived and/or interpreted by a human. As a result, a human end user may click and/or press the submit button 310 because the human end user perceived and/or interpreted the visual pattern to be an "eye." If the end user selects positions of the first circle pattern 302 and the second circle pattern 304 within a specified range of overlap then the CAPTCHA system may authenticate and/or validate the end user as a human.

Example cognitive CAPTCHA 300 comprising a moiré pattern test may distinguish between human and machine end users for several reasons. The following reasons are illustrative and there may be additional reasons why the cognitive CAPTCHA 300 is successful. For example, it may difficult for a computer and/or machine to interpret and/or analyze a moiré pattern similar to how a human may interpret a moiré pattern through cognitive processing. It may be difficult to mathematically and/or programmatically correlate a moiré pattern to visual representations of objects and/or things, whereas such correlations may immediately occur to humans due to cognitive processing. Furthermore, it may be difficult to program and/or instruct a machine to interact with the user interface of a cognitive CAPTCHA comprising a moiré pattern test. For example, the pattern adjuster 305 of cognitive CAPTCHA 300 may be difficult to be interacted with by a machine and/or computer. Therefore, cognitive CAPTCHA 300 comprising a moiré pattern test may be successful at distinguishing between humans and machines.

In some embodiments, similar to the refresh button 212 of FIG. 2A, the refresh button 312 of cognitive CAPTCHA 300 of FIG. 3A may change and/or alter content of the cognitive CAPTCHA. For example, by clicking and/or pressing the refresh button 312, the visual patterns displayed and/or the instruction 330 may change and/or alter.

Figure 3C:
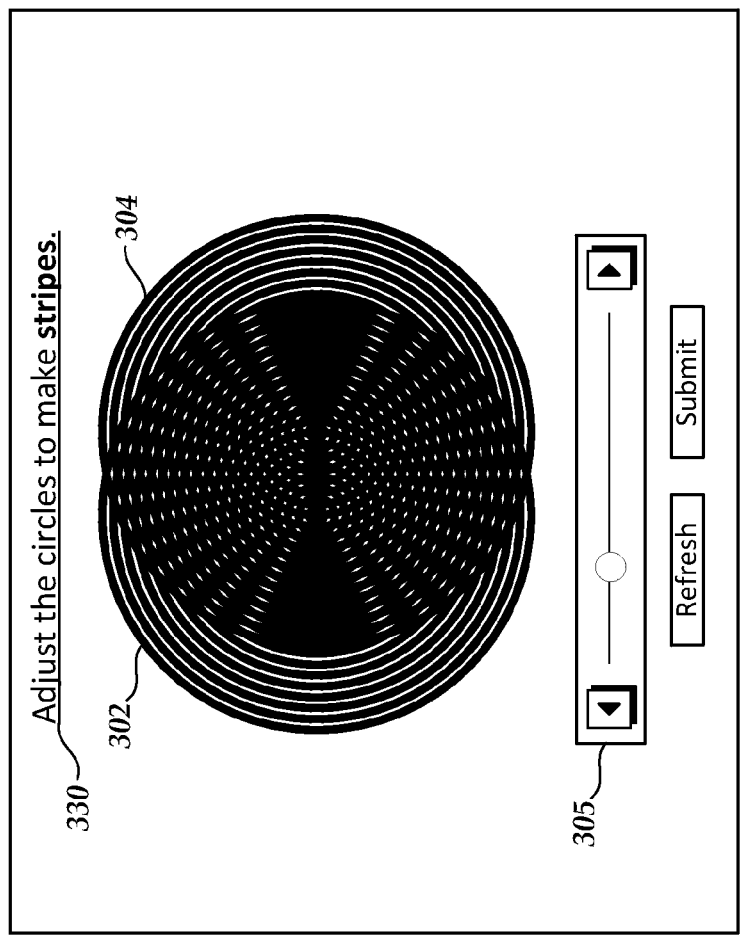
FIG. 3C illustrates an example cognitive CAPTCHA comprising an alternative moiré pattern test, according to some embodiments of the present disclosure.

FIG. 3C illustrates an example cognitive CAPTCHA comprising an alternative moiré pattern test. The instruction 330 of FIG. 3C may instruct the end user to "[a]djust the circles to make stripes" or "[a]djust the circles to make an asterisk-like shape in the overlapping area." The instruction 330 of FIG. 3A and FIG. 3C may have changed from an end user clicking and/or pressing the refresh button 312 of FIG. 3A. Similar to the end user interaction illustrated by FIG. 3A and FIG. 3B, the end user may adjust the pattern adjuster 305. As a result, a moiré pattern may have been created from the overlap of first circle pattern 302 and second circle pattern 304 of FIG. 3C. For example, the overlap between first circle pattern 302 and the second circle pattern 304 may have created a visual pattern, such as stripes as interpreted and/or viewed by a human end user.

In some embodiments, there may be some variations of the moiré patterns of cognitive CAPTCHAs. Moiré patterns may not be limited to circle patterns. For example, moiré patterns may comprise boxes, rectangles, lines, and all variations of shapes, figures, and/or lines. Moiré patterns may comprise variations of colors and not just black and/or white.

In some embodiments, there may be variations of the available user interactions with cognitive CAPTCHAs comprising moiré patterns. For example, the width of the lines, the number of lines, the speed and/or direction of rotation of the shapes and/or patterns, size of the shapes and/or patterns, relative position of the shapes and/or patterns, and/or colors of the lines, shapes, and/or patterns may all or in some combination thereof be modifiable by the end user to create moiré patterns. In some embodiments, alteration and/or modifications to the moiré patterns may be accomplished by moving, dragging, and/or dropping shapes and/or patterns through mouse input and/or touch input. For example, change of the relative position of first circle pattern 302 and second circle pattern 304 of cognitive CAPTCHA 300 in FIG. 3A may occur by touch screen dragging and dropping of first circle pattern 302 and/or second circle pattern 304. Furthermore, alteration and/or change of the position of the shapes and/or patterns may not be limited to horizontal movement. For example, the height and/or Y position of one or more of the shapes and/or patterns may be altered and/or changed.

In some embodiments, the cognitive CAPTCHA 300 of FIG. 3A may correspond to the CAPTCHA plugin 114 and/or the loading and/or execution of the CAPTCHA plugin 114 of FIG. 1.

Moiré patterns of cognitive CAPTCHAs may be in various formats. Moiré patterns may comprise formats such as source code and/or code instructions, graphic files, vector image formats such as the scalable vector graphic ("SVG") format, a database format, files, Extensible Markup Language ("XML"), JavaScript Object Notation ("JSON"), a file format that is proprietary to the CAPTCHA system, any other format and/or some combination thereof.

FIG. 3D illustrates example data comprising a moiré pattern of a cognitive CAPTCHA. Moiré data 370 may correspond to the first circle pattern 302 and/or second circle pattern 304 of FIG. 3A. Moiré data 370 illustrates an example XML and/or SVG format used to create the moiré patterns in FIGS. 3B and FIG. 3C. The tags and/or elements of moiré data 370 are illustrative and, thus, may not be syntactically complete and/or correct. Moiré data 370 may comprise twenty "<circle . . . >" elements. Each circle element may be initially positioned at the coordinate "x='0' y='0'," but may have increasing radiuses. For example, the radius of the circle element with identity "circle1" may comprise a radius of "0.065," the radius of the circle element with identity "circle2" may comprise a radius of "0.165," and so on in an increasing series until the circle element with identity "circle20" may comprise a radius of "1.965." Moiré data 370 may correspond to one circle pattern and may be duplicated and/or repeated to correspond to one or more additional circle patterns.

In some embodiments, the pattern data, such as example moiré data 370, may be combined with other techniques and/or methods to create a cognitive CAPTCHA and/or moiré pattern. For example, moiré data 370 may be transformed and/or translated by changing the coordinates of the origin and/or the X and/or Y coordinates. Pattern data, such as example moiré data 370 may be combined with source code and/or code instructions to manipulate and/or transform the pattern and/or shape data. The pattern data, following end user interaction, may be transmitted along with other data to validate and/or authenticate a human end user.

Where a dynamic image and/or pattern caused by code instructions and/or pattern data is not desirable, a series of static images may be presented to the end user to determine image selection based on moiré qualities. For example, the various images of the circle patterns from FIGS. 3A, 3B, and/or 3C may be displayed to the end user and the end user may be asked to identify the image corresponding to an "eye" or "stripes."

In some embodiments, formulas may be used to represent and/or characterize moiré patterns. For example, a shape moiré and/or band moiré may comprise a revealing layer comprising black lines with transparent lines and a base layer comprising periodically repeating shapes. When the revealing layer is overlayed and/or superimposed over the base layer, the repeating pattern in the base layer is stretched and/or runs along the vertical axis. Furthermore, the shapes and/or patterns that are created are magnified versions of the repeating pattern. In some embodiments, a band moiré pattern may be represented by the following formula:

$$P_m = \frac{P_b * P_r}{P_b - P_r}$$

$P_b$ may denote and/or indicate the period of shapes in the base layer. $P_r$ may denote and/or indicate the period of transparent lines in the revealing layer. $P_m$ may denote and/or indicate the size of the optical shapes magnified along the vertical axis and/or the period of the moiré shapes and/or lines.

An example of the formula may be the following. For example, both the base layer and the revealing layer may comprise repeating parallel lines. The period of the base layer, $P_b$, i.e., the space between the parallel lines, may be thirteen. The period of the revealing layer, $P_r$, may be twelve. The period of moiré lines, $P_m$, may be one hundred and fifty six. Thus, various moiré patterns may be generated by altering the input numbers $P_b$ and $P_r$.

In some embodiments, similar to any computation and/or validation that may be desirable to occur in the CAPTCHA system, it may be desirable for some or all of the code instructions that may transform the content of a cognitive CAPTCHA to occur in the CAPTCHA system. For example, some of the user interaction data may be transmitted to the CAPTCHA system and the CAPTCHA system may stream the content, such as the image and/or audio, to the end user computing device.

In some embodiments, there may be some variations of cognitive CAPTCHAs comprising moiré patterns to prevent scaling. Moiré patterns and/or effects may be affected and/or impacted by changes to device screen resolutions and/or upscaling or downsizing of images. In some embodiments, code instructions may be used to prevent rescaling. For example, there may be HTML markup instructions instructing the web browser and/or viewing device not to scale. In some embodiments, the end user may be informed that scaling may prevent a proper cognitive CAPTCHA test. In some embodiments, the cognitive CAPTCHA may determine the available space in the end user's screen and/or display and generates a pattern that does not require scaling. In some embodiments, the CAPTCHA system may alter the pattern data and/or pattern based on the end user computing device and/or may validate and/or authorize the end user based on end user computing device's particular configuration and/or settings. For example, display type and size may be determined through HTTP headers, local variables, and/or other methods.

Example Moiré CAPTCHA—Website Implementation

Figure 4A:
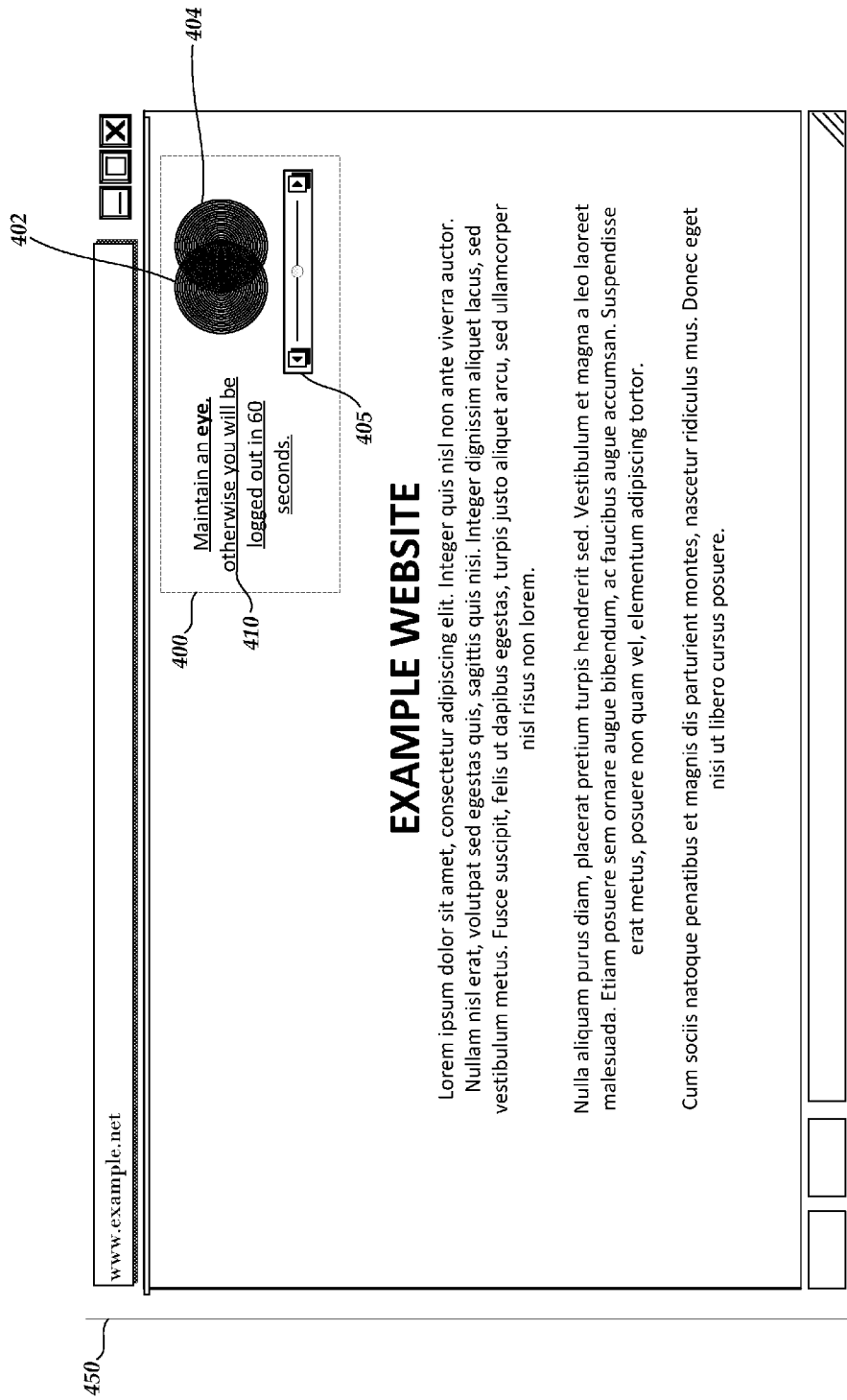
FIG. 4A illustrates an example website comprising an example cognitive CAPTCHA comprising a moiré pattern, according to some embodiments of the present disclosure.
Figure 4B:
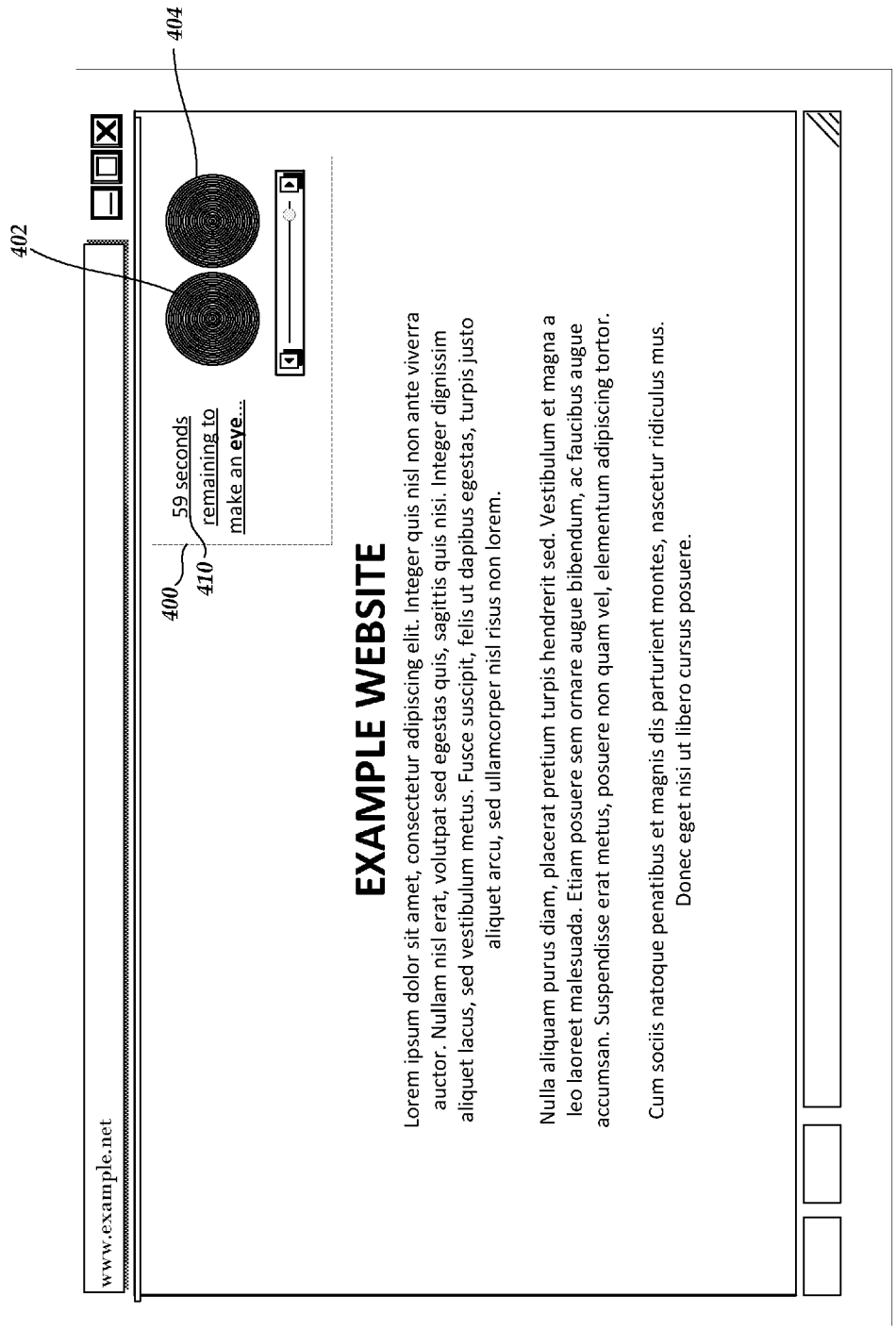
FIG. 4B illustrates an example website comprising an example cognitive CAPTCHA after some time has elapsed, according to some embodiments of the present disclosure.
Figure 4C:
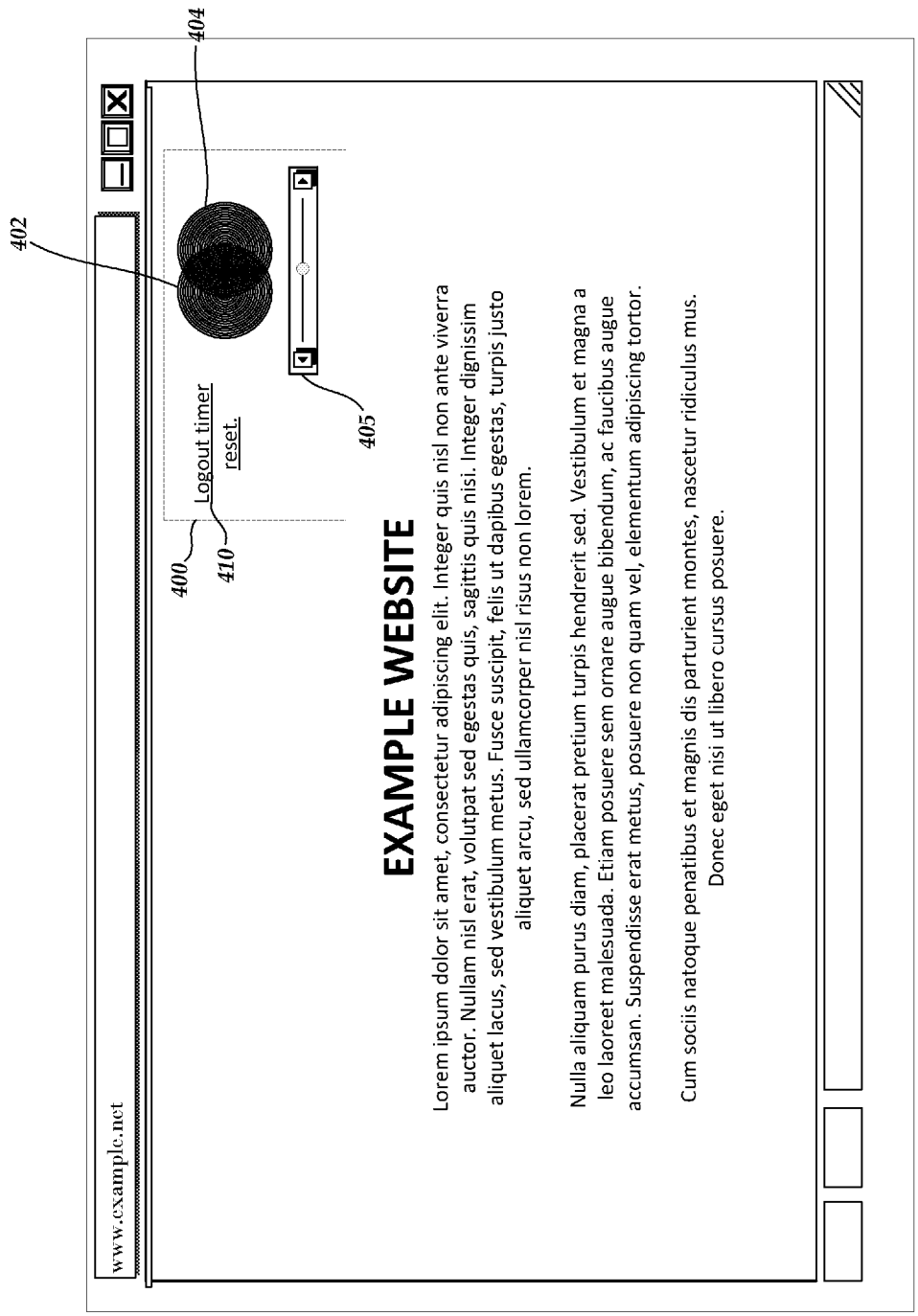
FIG. 4C illustrates an example website comprising an example cognitive CAPTCHA comprising a moiré pattern after further user interaction, according to some embodiments of the present disclosure.

In some embodiments, cognitive CAPTCHAs comprising moiré patterns may be implemented in websites. FIG. 4A illustrates an example cognitive CAPTCHA implementation. The cognitive CAPTCHA 400 may comprise an instruction 410, a first circle pattern 402, a second circle pattern 404, and a pattern adjuster 405. The components of CAPTCHA 400 may comprise similar functionality to the components of cognitive CAPTCHA 300 of FIG. 3A. For example, the pattern adjuster 405 may adjust the relative positions of the first circle pattern 402 and/or the second circle pattern 404. An end user, upon visiting the example website 450 through a web browser may interpret and/or read the instruction 410 to "[m]aintain an eye, otherwise you will be logged out in 60 seconds." The cognitive CAPTCHA 400 may remain visible throughout a session at the website 450 and/or be brought back to visibility at some point within a session. As time passes and/or in response to other events, the settings of the cognitive CAPTCHA 400 may be altered and/or appear to drift from the end user's selected settings. For example, as illustrated by FIG. 4B, the cognitive CAPTCHA 400 may have altered and/or changed after the elapse of time. The relative positions of first circle pattern 402 and/or a second circle pattern 404 may have drifted to their respective current positions of no overlap as illustrated by FIG. 4B. Furthermore, instruction 410 may have changed to comprise the text of "59 seconds remaining to make an eye . . . " to indicate to the end user that a logout will occur if further user interaction is not taken. For example, FIG. 4C may illustrate the cognitive CAPTCHA 400 after further end user interaction. For example, to avoid from being logged out, the end user may have interacted with the pattern adjuster 405 to adjust the relative positions of the first circle pattern 402 and/or the second circle pattern 403 to within a range and/or threshold to validate and/or authenticate a human end user.

In some embodiments, cognitive CAPTCHA 400 may fade in and/or out. For example, once the cognitive CAPTCHA 400 is reset, the CAPTCHA 400 may fade out because user interaction is not necessary. However, as the logout period gets closer, the cognitive CAPTCHA 400 may fade in, become more prominent, bolder, and/or highlighted to indicate to the end user that further interaction may be necessary.

In some embodiments, the patterns and/or tests of the cognitive CAPTCHA 400 may change over time. For example, the instruction 410 may change from requiring making an "eye" to "stripes." In some embodiments, the patterns themselves may change from circles to squares and/or other shapes over time.

There may be several advantages to persistent cognitive CAPTCHAs as illustrated by FIG. 4. For example, authentication and/or reauthentication mechanisms may often annoy end users because such mechanisms completely interrupt the end user's session and/or experience. In the example cognitive CAPTCHA 400, a user may adjust the settings as needed during breaks of website activity and/or other periods when it is less intrusive. The use of persistent and/or drifting cognitive CAPTCHAs is not limited to moiré patterns as shown in FIG. 4, but rather may be used with any other CAPTCHAs and/or systems, methods, and/or techniques disclosed herein. Additional advantages of persistent cognitive CAPTCHAs may include thwarting outsourcing of CAPTCHA "solving." For example, teams of human end users, such as hundreds or thousands of people, may be employed to solve and/or complete CAPTCHAs to provide the answers to automated computer systems to bypass human validation systems in the future. However, if systems and/or websites employ persistent CAPTCHAs, it may be very difficult or impossible to design computer systems to continuously interact with persistent cognitive CAPTCHAs. Furthermore, it may be prohibitively expensive and/or economically infeasible to employee human operators to remain logged into websites and/or systems that comprise persistent cognitive CAPTCHAs. Therefore, persistent cognitive CAPTCHAs may further promote distinguishing between humans and machines and discourage the outsourcing of solving CAPTCHAs.

Example Pattern CAPTCHAs

In some embodiments, cognitive CAPTCHAs may comprise various visual patterns. Another aspect of the difference between human perception and interpretation by computers is that human cognitive processing may easily identify and/or infer patterns within objects and/or images. For example, a human looking at clouds in the sky or pictures of clouds may see an elephant, a car, or a person. On the other hand, a computer presented with a variety of photographs of clouds would find it difficult to identify which of the clouds a human would perceive as an object, such as an elephant. Another example of finding representations of objects within an unrelated image may include inkblot and/or rorschach patterns.

FIG. 5A illustrates an example cognitive CAPTCHA comprising a rorschach pattern. The user interface of cognitive CAPTCHA 500 may comprise a submit button 510, and a refresh button 512, an audio button 514, a microphone 508, and a text box 506, which may behave similarly to the user interface of cognitive CAPTCHA 200 of FIG. 2. Cognitive CAPTCHA 500 may comprise pattern 502 that may be a digital inkblot and/or rorschach pattern. A feature of pattern 502 may be that the pattern is symmetrical. Pattern 502 may have been automatically and/or randomly generated by a system such as the CAPTCHA system. Instructions 504, "[w]hat do you see," may prompt the end user to type and/or respond with an object and/or idea that the human end user associates with the pattern 502. For example, human end users may perceive, interpret, and/or see a "person" by looking at pattern 502 because the inkblot appears to have a head, body, arms, and/or legs, which comprise a human and/or person drawing.

Cognitive CAPTCHAs may comprise audio and/or recordings that elicit unrelated identifications and/or pattern recognitions. For example, if the end user presses and or clicks the audio button 514, the end user may be played randomly generated audio noises and/or sounds to elicit identification with objects and/or things, such as an association with the "ocean" because a human end user may interpret the sounds as sounds of the ocean.

Figure 5B:
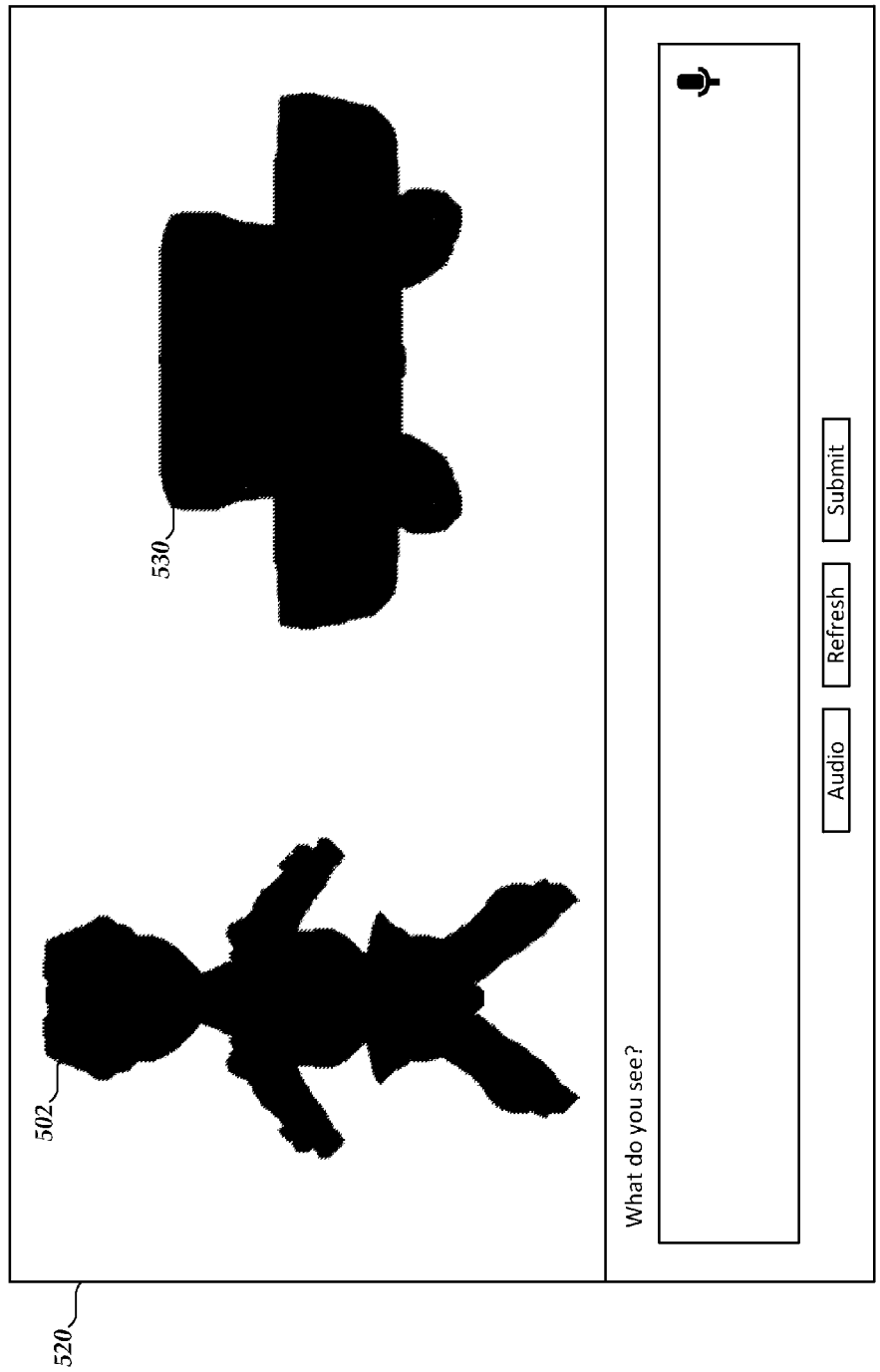
FIG. 5B illustrates an example cognitive reCAPTCHA comprising rorschach patterns, according to some embodiments of the present disclosure.

ReCAPTCHAs may be applied visual, moiré, audio, and/or other types of patterns. FIG. 5B illustrates an example cognitive reCAPTCHA comprising rorschach patterns. Cognitive reCAPTCHA 520 may comprise pattern 502 and pattern 530. For example, pattern 502 may be a known and/or solved pattern where the correct human validation answer is "person." However, the pattern 530 (which may have been randomly and/or automatically generated by the CAPTCHA system) may be an unknown and/or unsolved. In other words, there may be no known association with what the pattern 530 looks like when perceived by humans. For example, humans may interpret and/or perceive pattern 530 as a hat with eye and/or a car. Therefore, when end users submit answers through the cognitive reCAPTCHA 520, if the answer to pattern 502 is correct, then the CAPTCHA may store and/or use the second answer to the pattern 530 (such as "hat" or "car"). As a result, the CAPTCHA system may collect answers to unknown visual, audio, and/or other types of patterns, which may be randomly and/or automatically generated. In some embodiments, the first answer to a validated unknown pattern will be saved and/or stored as the answer to that pattern. In some embodiments, an unknown pattern will be "solved" when the number of answers for that unknown pattern surpasses a given and/or configurable threshold.

In some embodiments, cognitive CAPTCHAs comprising visual representations may be asymmetric, such as, but not limited to, images and/or representations of clouds.

In some embodiments, cognitive CAPTCHAs may comprise visual and/or audio vibrations. Regarding visual vibrations, a result of the biological properties of the human eye and/or human brain is that humans may perceive an image as changing and/or moving when the image may be vibrating. For example, a three dimensional image may be generated from vibrating and/or oscillating the image. It may be difficult to program code instructions of a computer and/or machine to mimic human perception to recognize patterns and/or movements from visual vibrations. In a similar manner, interference between sound waves and/or filtering of sound waves may also be used in cognitive CAPTCHAs. A voice and/or other signal may be embedded within a sound that contains other, masking sounds. In some embodiments, a human voice recording may be isolated at a frequency and/or frequency range (such as using an auto-tuner) and masking sounds may be kept out of that frequency range in whole or in part. For example, a human voice recording may be auto-tuned to two kilohertz and/or masking noises introduced at higher volumes and/or frequencies at other portions of the range, but at a volume and/or frequency over which a human voice can be heard at two kilohertz. The end user would then be prompted to use an equalizer function to reduce and/or eliminate noises at other ranges, which may move and/or shift the range until the end users identifies the voice. In some embodiments, the end user may be asked to identify the end users' own voice in a range of voices and/or noise recordings.

Figure 5D:
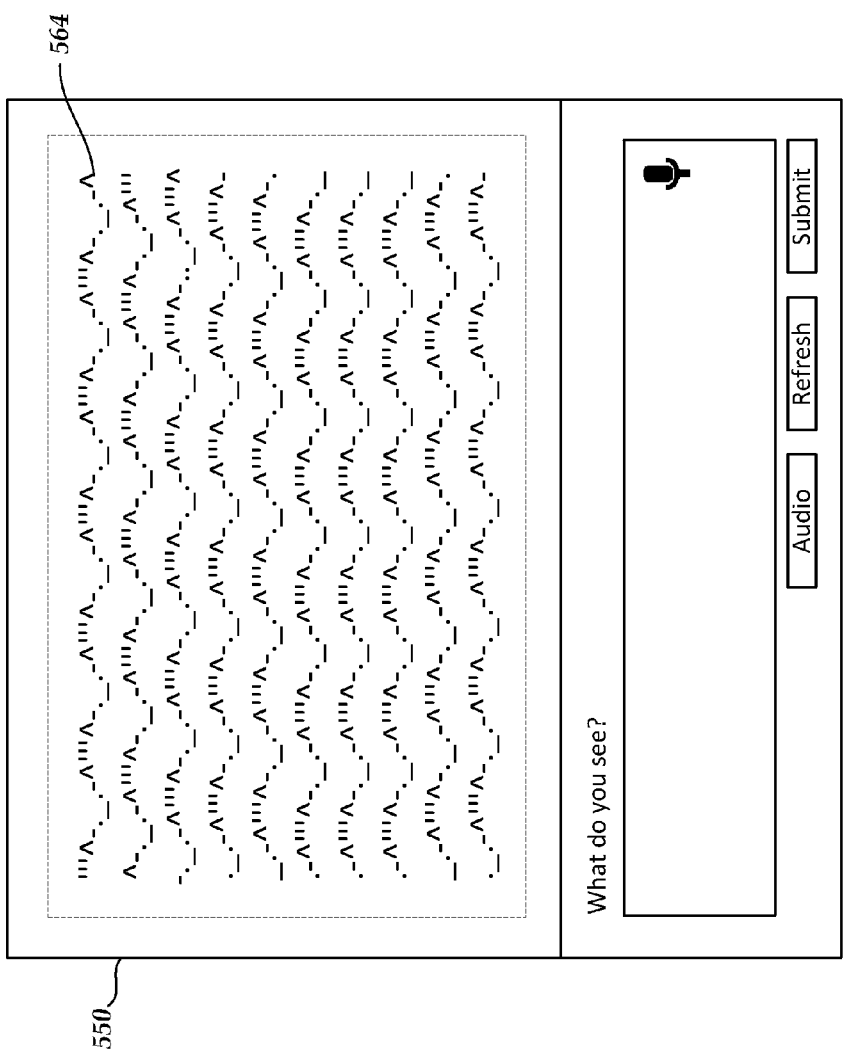
FIG. 5D illustrates an example cognitive CAPTCHA comprising a visual persistence pattern after the elapse of some time, according to some embodiments of the present disclosure.

In some embodiments, the phenomenon of human visual persistence may be used to create or enhance CAPTCHAs. Indeed, in this manner, a CAPTCHA could be presented in an output window, such as, but not limited to, a command line window. For example, a program may generate a random or semi-random stream of character lines (for example, ten or forty character lines). FIG. 5C illustrates an example cognitive CAPTCHA comprising a visual persistence pattern. Cognitive CAPTCHA 550 comprises an output window 562 with text output 564. The text output 564 may be random and/or semi-random. FIG. 5D illustrates the text output 564 after the elapse of time. In the example, the cognitive CAPTCHA 550 may stream new lines of characters to create the visual pattern of waves as perceived by a human end user. For example, the lines of text may scroll up the screen as new lines of text are added at the bottom (or scrolling in the opposite direction in some embodiments) to illustrate some object or movement that isn't obvious in a single snapshot of the output window 562. The correct answer to cognitive CAPTCHA 550 may be "waves" and/or "waving." It may be difficult for a machine to recognize such a pattern. In some embodiments, the end user may be provided several multiple choice answers to select from.

In some embodiments, a cognitive CAPTCHA with an output window may rearrange the lines by swapping one or more characters in a manner that creates a pattern as multiple lines scroll past. In one aspect, this could be done by having the character "l" or the number one ("1") or the exclamation point (which are all similar in that they are vertical lines) move between positions as the lines go past, following a pattern such as "move to the right, wait a short time, move to the right twice more with an even shorter delay, then slowly move back left." For example, the pattern of "move to the right, wait a short time, move to the right twice more with an even shorter delay, then slowly move back left," may be one of several multiple choice answers for the end user to select from. A human may identify the pattern (e.g., the movement of a particular character or group of characters), whereas a machine would have difficulty doing so. Such difficulty may be increased if different characters are used, such as, but not limited to, a blank space, characters with primarily horizontal lines, characters with two vertical lines, etc. In some embodiments, the character need not be present on every line, so the composition of the line characters in the aggregate can be random, although the rearrangement would not be.

In some embodiments, visual persistence may be used to create patterns in flowing artwork and/or graphics. For example, many music "visualizers" create graphical patterns that move in conjunction with changes to ambient sound. Such changes, with or without the sound, present patterns easily noticed by a human but far more difficult to identify for a computer. In some embodiments, the end user may be asked to speak in a certain pattern to create a specified effect in a visualize as part of a CAPTCHA (e.g., "make the visualizer bump in a manner similar to the beat of the chorus of Queen's 'We Will Rock You'").

In some embodiments, cognitive CAPTCHAs may comprise animations and/or request the end user to identify actions and/or verbs (e.g., rather than the actual objects in the images). For example, using the output window and/or command line techniques illustrated above, the cognitive CAPTCHA may display a text-based stick figure walking and/or a horse galloping. Thus, the correct answer to the example cognitive CAPTCHA may be an action word and/or verb, such as, but not limited to, "walking," "running," "galloping," etc. In some embodiments, the cognitive CAPTCHAs may comprise animation formats and/or techniques, such as, but not limited to, Graphic Interchange Format ("GIF"), Flash, SVG, XML, JavaScript, AJAX, and/or some combination thereof. Unlike human end users, it may be difficult for computers and/or machines to identify actions because some computers and/or machines may be programmed for object and/or image recognition. Cognitive CAPTCHAs comprising animations and/or verb tests may be combined, in part or whole, with other methods, systems, and/or techniques described in this disclosure.

In some embodiments, patterns may be generated through printed patterns, patterns on digital methods, and/or other methods of displaying content other than through computing systems. In some embodiments, content may be encrypted through the systems, methods, devices, and/or techniques disclosed herein. In some embodiments, the systems, methods, devices, and/or techniques disclosed herein related to cognitive CAPTCHAs may be used as passwords and/or components of passwords. For example, an end user may adjust a moiré pattern to a certain level and/or threshold, such as the moiré patterns illustrated in FIG. 3B and/FIG. 3C, to validate and/or authorize the end user. In some embodiments, the circle moiré patterns may visually recognize the look and/or feel of a combination lock.

Example CAPTCHA Delivery Methods

In some embodiments, the delivery and/or transmission of the CAPTCHA may be varied to verify and/or validate a human end user. The systems, methods, devices, and/or techniques disclosed in the Location reference may be used with CAPTCHAs. For example, a CAPTCHA may be sent by text message and/or email to an end user's mobile device according to the systems, methods, devices, and/or techniques disclosed in the Location reference and/or otherwise. In some embodiments, the CAPTCHA may be sent only to a particular network, which may frustrate the outsourcing of CAPTCHA breakers to teams of humans who may be located outside of the particular network. In some embodiments, the CAPTCHA may only accept answers sent from a particular location and/or locale, which may also prevent the outsourcing situation. In some embodiments, cognitive CAPTCHAs may be prohibited from being displayed on mobile devices and/or particular mobile devices to guarantee proper display of the cognitive CAPTCHA.

Example Search Engine Capture Management

In some embodiments, the systems, methods, devices, and/or techniques disclosed herein may be used for search engine capture management. A persistent problem for web publishers, such as, but not limited to, Twitter posters, blog writers and/or bloggers, and/or article publishers, is that web publishers may be unable to manage how search engines, web crawlers, and/or other web services digitally us and read their content. For example, an article regarding breast cancer is published and/or posted to the Internet, the article may be indexed by a search engine and/or returned by search engines for searches of pornography. Furthermore, pornographic advertisements may appear in proximity to the article when displayed in search results. There may be a convention for search engines and/or other web services to read the robots.txt file and/or refuse to index pages indicated as excluded in that file, search engines and/or other web services may simply ignore the robots.txt file. However, using the systems, methods, devices, and/or techniques disclosed herein regarding cognitive language techniques the content that search engines and/or other web crawlers index may be managed and/or limited. For example, the text article provided to the search engine and/or other web crawler may contain the misspelled word "breats," which may be properly interpreted by human end users but may not be indexed by automated search engines and/or other web crawlers. In some embodiments, the type of alteration may be based on at least in part on the entity, device, service, and/or Internet Protocol address requesting the data. For example, the Google search engine may receive the altered data and/or text while a medical search engine may receive the unaltered data and/or text. In some embodiments, an image may be altered based on the requesting service. Similar to the altered text data, a blacked out and/or censored image of a breast may be sent to the search engine but the correct image may be sent to the medical search engine.

Example Digital Watermarking

In some embodiments, the systems, methods, devices, and/or techniques regarding cognitive language processing disclosed herein may be used for digital watermarking. In some embodiments, misspellings and/or substitutions of letters and/or symbols may be introduced to digital documents as a form of a digital signature and/or unique identifier. For example, the intentional introduction of errors, such as "1" (the number one) in place of the letter "l", may be used to uniquely identify a document that is copied. Additional changes may be made, such as adding spaces, changing single quotes to double quotes, changing a short dash to a long dash, changing semi-colons to colons or periods, substituting abbreviations or contractions for their longer counterparts, changing capitalization of words, changing spelling of words amenable to multiple spellings or regionally different spellings (i.e. color vs. colour), substitution of synonyms, substitution of a negating word and an antonym, the reverse of all of the foregoing, and/or any other changes. By making such changes, data may be placed into a document that is not apparent to a human end user. In some embodiments, the types of changes that may be made do not trigger a spell check flag and/or alert and/or an automatic correction by optical character reading software and/or word processing software. In some embodiments, additional changes may be made to the document unrelated to the one or more unique identifiers such that a plurality of copies of the document cannot be easily compared in order to identify the digital watermark.

In some embodiments, digital watermarks may be embedded in a document and/or stored in a database to indicate one or more end users and/or persons that have been given permissions to access the document. For example, if a scientific article hosted on a web page and/or website was tracked according to one or more of these mechanisms, the identity of the subscriber, the IP address used for access, and/or other information may be entered into a database together with an entry indicating the watermarking done to the document associated with that information.

Implementation Mechanisms

The various computing device(s) discussed herein, such as the CAPTCHA system 100 of FIG. 1, are generally controlled and coordinated by operating system software, such as, but not limited to, iOS, Android, Chrome OS, Windows XP, Windows Vista, Windows 7, Windows 8, Windows Server, Windows CE, Unix, Linux, SunOS, Solaris, Macintosh OS X, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things. The CAPTCHA system 100 may be hosted and/or executed on one or more computing devices with one or more hardware processors and with any of the previously mentioned operating system software.

Figure 6:
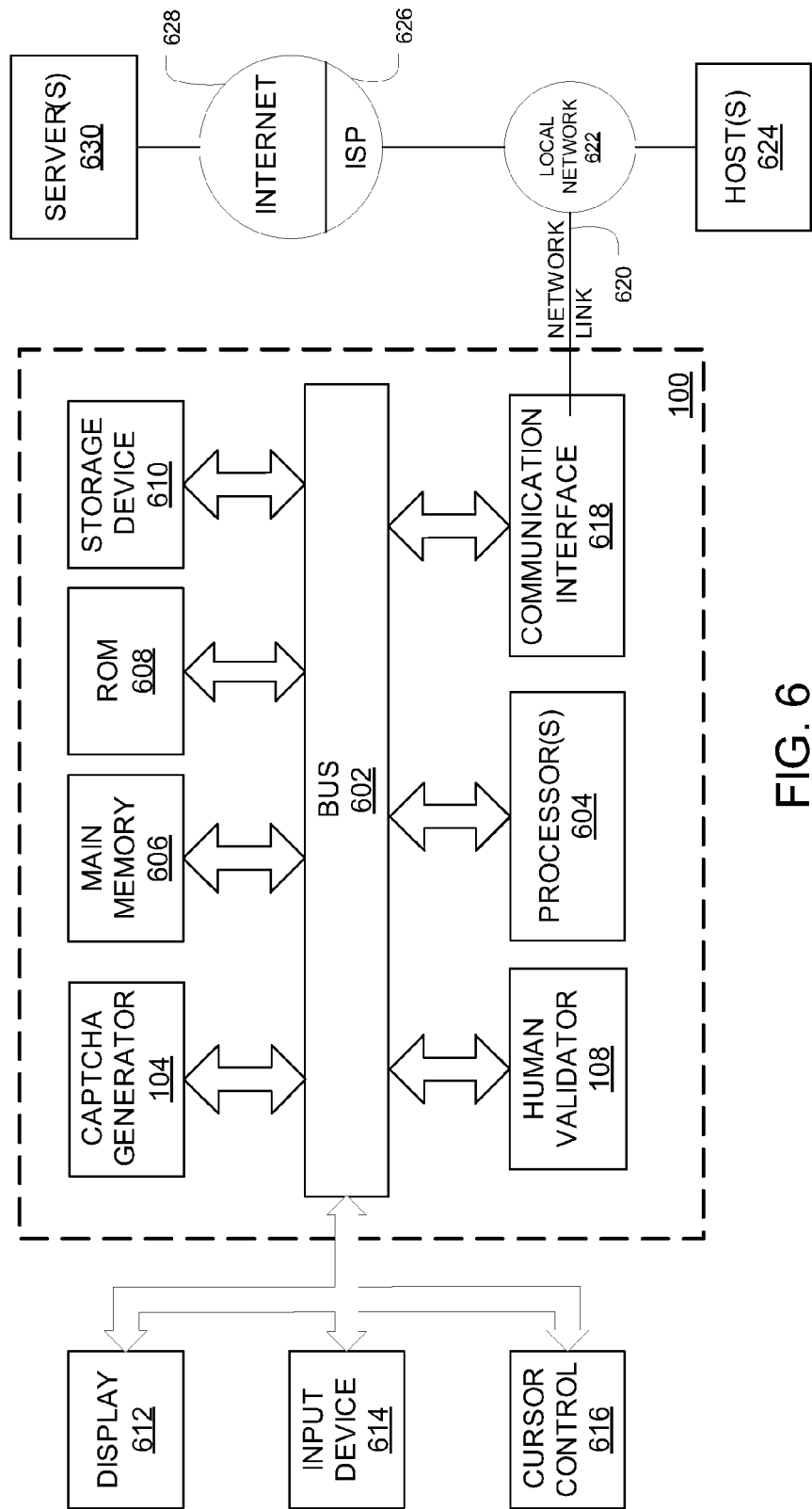
FIG. 6 is a block diagram illustrating an example CAPTCHA system with which various methods and systems discussed herein may be implemented.

FIG. 6 is a block diagram that illustrates example components of the CAPTCHA system 100. While FIG. 6 refers to the CAPTCHA system 100, any of the other computing devices discussed herein may have some or all of the same or similar components.

The CAPTCHA system 100 may execute software, e.g., standalone software applications, applications within browsers, network applications, etc., whether by the particular application, the operating system, or otherwise. Any of the systems discussed herein may be performed by the CAPTCHA system 100 and/or a similar computing system having some or all of the components discussed with reference to FIG. 5.

The CAPTCHA system 100 includes a bus 602 or other communication mechanism for communicating information, and a hardware processor, or multiple processors, 604 coupled with bus 602 for processing information. Hardware processor(s) 604 may be, for example, one or more general purpose microprocessors.

The CAPTCHA system 100 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render the CAPTCHA system 100 into a special-purpose machine that is customized to perform the operations specified in the instructions. Such instructions, as executed by hardware processors, may implement the methods and systems described herein for sharing security information.

The CAPTCHA system 100 further includes a read only memory (ROM) 608 or other static storage device coupled to bus 602 for storing static information and instructions for processor(s) 604. A storage device 610, such as a magnetic disk, optical disk, or USB thumb drive (Flash drive), etc., is provided and coupled to bus 602 for storing information and instructions. The CAPTCHA storage device 106 FIG. 1 may be stored on the main memory 606 and/or the storage device 610.

In some embodiments, the CAPTCHA storage device 106 of FIG. 1 is a file system, relational database such as, but not limited to, MySql, Oracle, Sybase, or DB2, and/or a distributed in memory caching system such as, but not limited to, Memcache, Memcached, or Java Caching System.

The CAPTCHA system 100 may be coupled via bus 602 to a display 612, such as a cathode ray tube (CRT) or LCD display or touch screen, for displaying information to a computer user. An input device 614 is coupled to bus 602 for communicating information and command selections to processor 604. One type of input device 614 is a keyboard including alphanumeric and other keys. Another type of input device 614 is a touch screen. Another type of user input device is cursor control 616, such as a mouse, a trackball, a touch screen, or cursor direction keys for communicating direction information and command selections to processor 604 and for controlling cursor movement on display 612. This input device may have two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The CAPTCHA system 100 may include a user interface unit to implement a GUI, for example, FIGS. 2, 3, 4, and/or 5, which may be stored in a mass storage device as executable software codes that are executed by the computing device(s). This and other units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The CAPTCHA system 100 and/or the CAPTCHA plugin 114 of FIG. 1 may be configured to be compatible with web browsers such as, but not limited to, Firefox, Internet Explorer, Safari, and/or Chrome.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. Certain web programming methods may be used such as AJAX. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The CAPTCHA system 100, or components of it, such as the CAPTCHA generator 104 and/or the human validator of FIG. 1 and/or FIG. 6, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor(s) 604 for execution. For example, the instructions may initially be carried on a magnetic disk or solid state drive of a remote computer. The remote computer may load the instructions into its dynamic memory and send the instructions over a telephone or cable line using a modem. A modem local to the CAPTCHA system 100 may receive the data on the telephone or cable line and use an infra-red transmitter to convert the data to an infra-red signal. An infra-red detector can receive the data carried in the infra-red signal and appropriate circuitry can place the data on bus 602. Bus 602 carries the data to main memory 606, from which the processor(s) 604 retrieves and executes the instructions. The instructions received by main memory 606 may retrieve and execute the instructions. The instructions received by main memory 606 may optionally be stored on storage device 610 either before or after execution by processor(s) 604.

The CAPTCHA system 100 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to be communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from the CAPTCHA system 100, are example forms of transmission media.

A network, such as the network 160 of FIG. 1, may comprise, but is not limited to, one or more local area networks, wide area network, wireless local area network, wireless wide area network, the Internet, or any combination thereof.

In some embodiments, there may be some variations of communication. For example, the Hypertext Transfer Protocol ("HTTP") may be used for communication through the network 160, which may correspond to the Internet and/or any combination of networks. For example, the website request 112, CAPTCHA plugin 114, CAPTCHA request and/or data 116, user interaction data 118, and/or a validation request and/or response 120 of FIG. 1 may be sent through the network 160 through HTTP requests and/or responses. In some embodiments, the CAPTCHA environment 190 may not comprise a third party web server 110 of FIG. 1. For example, the user computing device 102 of FIG. 1 may communicate with the CAPTCHA system 110 without the third party web server 110 as an intermediary. In some embodiments, the CAPTCHA system may be used without the use of the Internet. The CAPTCHA system may communicate directly with the user computing device 102 without the use of the Internet. For example, the request 112 may not be a website request but rather a CAPTCHA plugin request.

The CAPTCHA system 100 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor(s) 604 as it is received, and/or stored in storage device 510, or other non-volatile storage for later execution.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to validate heteronym CAPTCHAs, the computer system comprising:
   one or more hardware processors programmed, via executable code instructions, to implement:
   a CAPTCHA generator module configured to:
      determine a phrase of words that, when perceived together, comprises one or more meanings associated with the phrase of words that assist human perception of the phrase of words, and further comprises a heteronym having a particular meaning, of multiple possible meanings for the heteronym, in conjunction with use in the phrase of words; and
      generate a heteronym CAPTCHA user interface depicting:
         the phrase of words including the heteronym, wherein the heteronym is configured for human perception as to the particular meaning of the heteronym based on context of the heteronym within the phrase of words, and
         at least two options associated with respective two or more meanings for the heteronym, wherein at least one of the options is associated with the particular meaning of the heteronym within the phrase of words and at least one of the options is associated with an incorrect meaning of the heteronym within the phrase of words;
   a human validator module configured to:
      receive a selection of at least one of the options associated with the heteronym CAPTCHA user interface;
      determine whether the selected option is the option associated with the particular meaning of the heteronym within the phrase of words;
      generate an indication of whether the selected option was provided by a human based on said determination; and
      transmit the generated indication.

2. The computer system of claim 1, wherein the heteronym CAPTCHA user interface is configured for display as part of a website.

3. The computer system of claim 1, wherein the heteronym CAPTCHA user interface further comprises playable audio data corresponding to the phrase of words including the heteronym.

4. The computer system of claim 1, wherein the heteronym CAPTCHA user interface is delivered via a text message to a user computing device.

* * * * *